US012696264B2

(12) United States Patent (10) Patent No.: US 12,696,264 B2
Demonget et al. (45) Date of Patent: Jul. 28, 2026

(54) SYSTEMS AND METHODS FOR TIME DIVISION DUPLEX SLOT PATTERN DETERMINATION

(71) Applicant: Verizon Patent and Licensing Inc., Basking Ridge, NJ (US)

(72) Inventors: Sylvestre Demonget, Millburn, NJ (US); David Albert Rossetti, Randolph, NJ (US); Anand J. Shah, Parsippany, NJ (US); Madhusudan Mandyam Bheemarayan, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 587 days.

(21) Appl. No.: 18/155,265

(22) Filed: Jan. 17, 2023

(65) Prior Publication Data

US 2024/0015730 A1 Jan. 11, 2024

Related U.S. Application Data

(63) Continuation-in-part of application No. 17/811,726, filed on Jul. 11, 2022.

(51) Int. Cl.
*H04W 72/1263* (2023.01)
*H04L 5/14* (2006.01)
*H04W 72/0446* (2023.01)
*H04W 72/542* (2023.01)

(52) U.S. Cl.
CPC .......... *H04W 72/1263* (2013.01); *H04L 5/14* (2013.01); *H04W 72/0446* (2013.01); *H04W 72/542* (2023.01)

(58) Field of Classification Search
CPC ... H04L 1/08; H04L 5/14; H04L 5/16; H04W 72/0446; H04W 72/20; H04W 72/23; H04W 72/1263; H04W 48/12
USPC ........................................ 370/252, 280, 329
See application file for complete search history.

(56) References Cited

U.S. PATENT DOCUMENTS

| | | |
|---|---|---|
| 2013/0242812 A1 | 9/2013 | Khoryaev |
| 2019/0090222 A1* | 3/2019 | Wu ........................ H04W 72/20 |
| 2022/0095144 A1 | 3/2022 | Ren |
| 2022/0123915 A1* | 4/2022 | Yoshioka .................. H04L 5/14 |
| 2022/0182130 A1 | 6/2022 | Abedini |
| 2023/0062906 A1* | 3/2023 | Hamada ........... H04W 72/0446 |
| 2023/0063263 A1* | 3/2023 | Hamada ............... H04W 48/12 |
| 2023/0142158 A1 | 5/2023 | Sandberg |
| 2024/0283589 A1* | 8/2024 | Wang ............... H04W 72/0446 |

* cited by examiner

*Primary Examiner* — Harun Chowdhury

(57) ABSTRACT

In some implementations, a user equipment (UE) may determine that the UE is operating in a time division duplex (TDD) boundary region in which the UE receives or measures signals from two or more cells or other UEs. The UE may determine that a first TDD slot pattern associated with at least one of a first cell or a first other UE differs from a second TDD slot pattern associated with at least one of a second cell or a second other UE. The UE may determine a boundary region TDD slot pattern to be used for communications within the TDD boundary region based on at least one of the first TDD slot pattern or the second TDD slot pattern. The UE may communicate with a network device using the boundary region TDD slot pattern.

20 Claims, 16 Drawing Sheets

500

510 — Determine, by a UE, that the UE is operating in a TDD boundary region in which the UE receives or measures signals from two or more cells or other UEs 520 — Determine, by the UE, that a first TDD slot pattern associated with at least one of a first cell or a first other UE differs from a second TDD slot pattern associated with at least one of a second cell or a second other UE 530 — Determine, by the UE, a boundary region TDD slot pattern to be used for communications within the TDD boundary region based on at least one of the first TDD slot pattern or the second TDD slot pattern 540 — Communicate, by the UE, with a network device using the boundary region TDD slot pattern

200

RF Boundary

245
Macro outdoor
gNB 1
*DL-biased
TDD ratio*

265
UE1

270
UE2

260
TDD DL → UL
interference

275
TDD UL → DL
interference

250
Small cell indoor gNB 2
*UL:DL parity TDD ratio*

255
Building or similar
premises

| Type of interference | Impacted device | Detection method | Mitigation method |
|---|---|---|---|
| TDD DL → UL interference | gNB 2 | Detection assisted by UE 1 conveyed to gNB 1 (offender) | gNB 1 changes its TDD pattern (fewer DL) |
| | | Detection assisted by gNB 2 (requires prior knowledge of gNB 1 TDD pattern, or specific device) | gNB 2 changes its TDD pattern (fewer UL) |
| TDD UL → DL interference | UE 1 | Detection assisted by UE 2 (offender), optionally conveyed to gNB 2 | UE 2 changes its TDD pattern (fewer UL) |
| | | | gNB 2 changes its TDD pattern (fewer UL) |
| | | Detection by UE 1, conveyed to gNB 1 | gNB 1 changes its TDD pattern (fewer DL) |

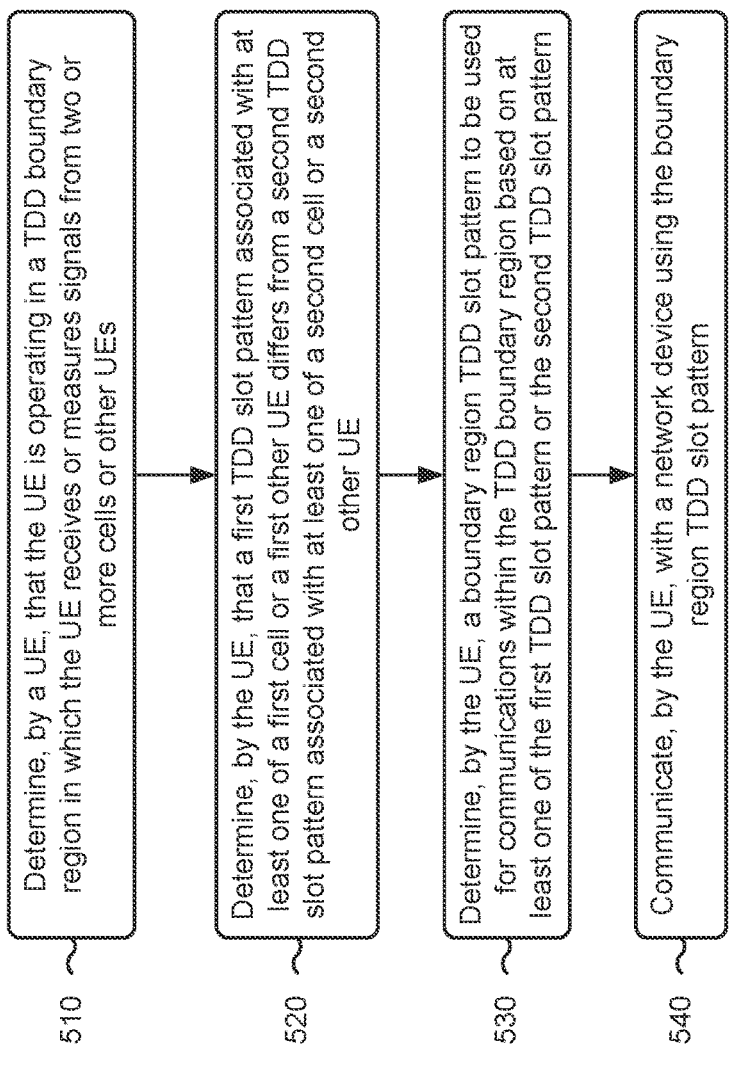

510 Determine, by a UE, that the UE is operating in a TDD boundary region in which the UE receives or measures signals from two or more cells or other UEs 520 Determine, by the UE, that a first TDD slot pattern associated with at least one of a first cell or a first other UE differs from a second TDD slot pattern associated with at least one of a second cell or a second other UE 530 Determine, by the UE, a boundary region TDD slot pattern to be used for communications within the TDD boundary region based on at least one of the first TDD slot pattern or the second TDD slot pattern 540 Communicate, by the UE, with a network device using the boundary region TDD slot pattern

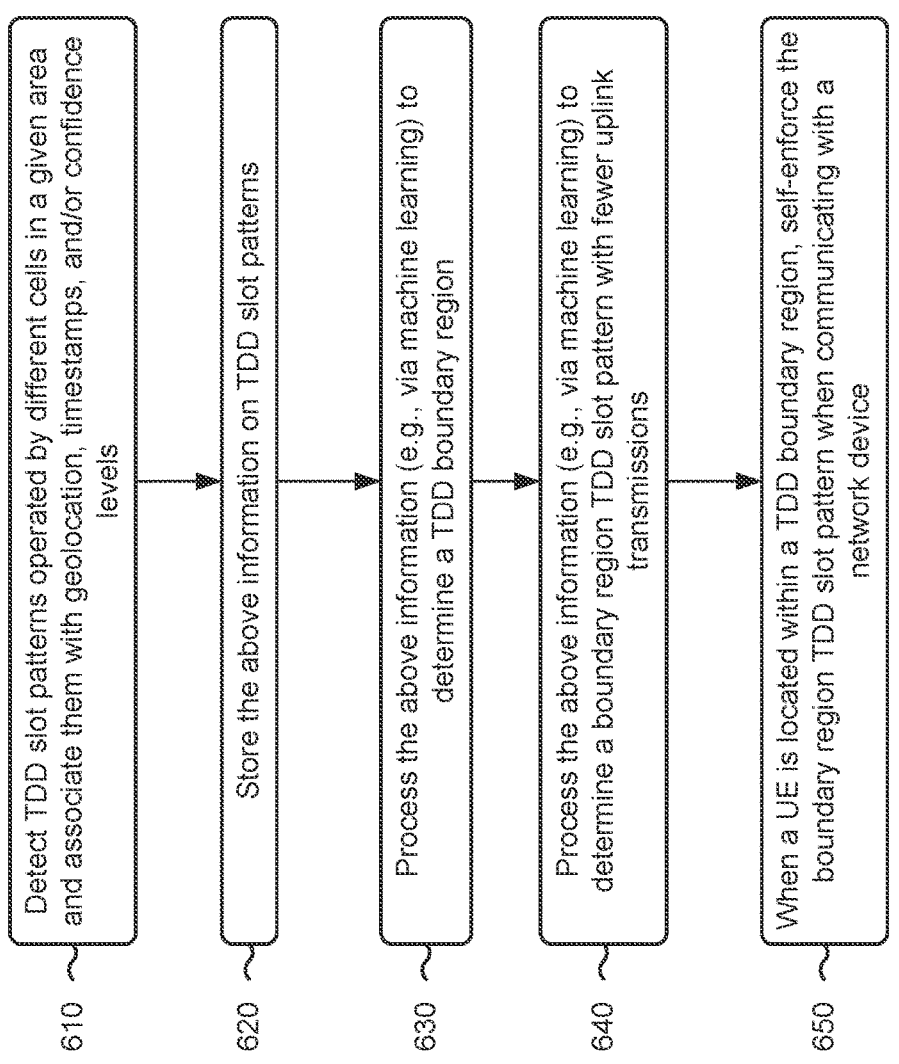

610 — Detect TDD slot patterns operated by different cells in a given area and associate them with geolocation, timestamps, and/or confidence levels 620 — Store the above information on TDD slot patterns 630 — Process the above information (e.g., via machine learning) to determine a TDD boundary region 640 — Process the above information (e.g., via machine learning) to determine a boundary region TDD slot pattern with fewer uplink transmissions 650 — When a UE is located within a TDD boundary region, self-enforce the boundary region TDD slot pattern when communicating with a network device

SYSTEMS AND METHODS FOR TIME DIVISION DUPLEX SLOT PATTERN DETERMINATION

CROSS-REFERENCE TO RELATED APPLICATION

This Patent Application is a continuation-in-part of, and claims priority to, U.S. patent application Ser. No. 17/811, 726, filed on Jul. 11, 2022, and entitled "SYSTEMS AND METHODS FOR TIME DIVISION DUPLEX SLOT PATTERN DETERMINATION." The disclosure of the prior application is considered part of and is incorporated by reference into this Patent Application.

BACKGROUND

A user equipment (UE) may establish a connection to a core network via a network device. The UE may communicate with the network device via downlink communications (e.g., communications from the network device to the UE) and uplink communications (e.g., communications from the UE to the network device). In some cases, downlink communications and uplink communications may be scheduled according to a time division duplex (TDD) slot pattern, in which certain symbols and/or slots are dedicated to downlink communications and in which other symbols and/or slots are dedicated to uplink communications.

BRIEF DESCRIPTION OF THE DRAWINGS

FIGS. 2A-2D are diagrams of another example associated with a TDD slot pattern determination.

FIG. 5 is a flowchart of an example process associated with a TDD slot pattern determination.

FIG. 6 is another flowchart of an example process associated with a TDD slot pattern determination.

DETAILED DESCRIPTION OF EXAMPLE EMBODIMENTS

Figure 1A:
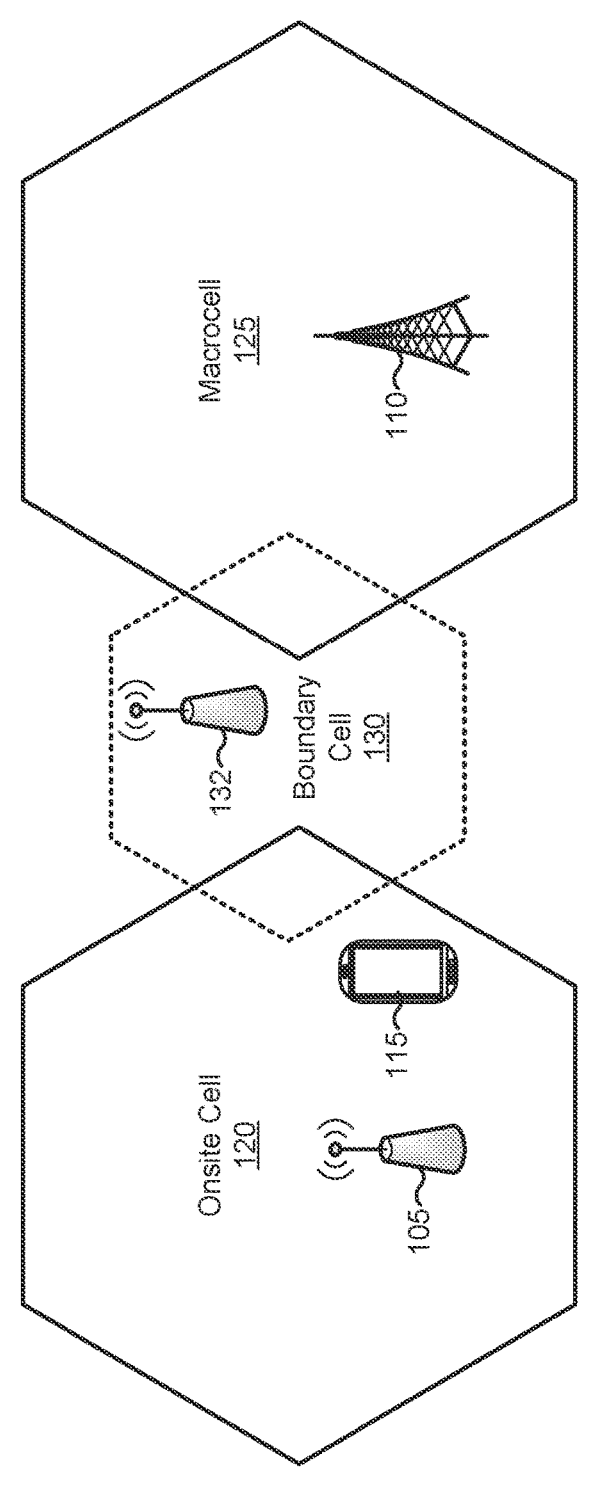
FIGS. 1A-1G are diagrams of an example associated with a TDD slot pattern determination.

The following detailed description of example implementations refers to the accompanying drawings. The same reference numbers in different drawings may identify the same or similar elements.

A wireless communication device, such as a user equipment (UE) or a similar device, may communicate with a network device in a wireless network. A network device may include a New Radio (NR) or 5G network device (sometimes referred to as a gNodeB (gNB)), a Long Term Evolution (LTE) or 4G network device (sometimes referred to as an eNodeB (eNB)), or a similar network device. Each network device may provide communication coverage for a particular area, sometimes referred to as a cell. A network device may be capable of providing coverage to a relatively large geographic area, sometimes referred to as a macrocell, or to a smaller area, sometimes referred to as a microcell, a picocell, a femtocell, a private cell, an onsite cell, and/or a similar cell. For example, a macro network device may be associated with a large antenna array and a high transmit power, providing broad coverage to many users within a macrocell, while an onsite network device may be associated with a smaller antenna array and/or a lower transmit power than a macro network device and may provide coverage to a limited number of subscribers located within a particular building, located on a particular premises, or the like.

A UE and a network device may communicate using a time division duplex (TDD) slot pattern, sometimes referred to as a TDD frame structure. More particularly, a transmission timeline for downlink and uplink communications may be partitioned into radio frames (sometimes referred to as just frames), with each frame having a predetermined duration (e.g., 10 milliseconds (ms)) and partitioned into a set of subframes. Each subframe may have a predetermined duration (e.g., 1 ms) and may include a set of slots, with the number of slots in each subframe varying according to a subcarrier spacing used for transmission. Each slot may include a number of orthogonal frequency-division multiplexing (OFDM) symbols (sometimes referred to as just symbols), such as, in some implementations, fourteen symbols. In some cases, certain slots and/or symbols may be dedicated for use as downlink slots and/or symbols (e.g., may be reserved for scheduling downlink communications between a network device and one or more UEs), while certain other slots and/or symbols may be dedicated for use as uplink slots and/or symbols (e.g., may be reserved for granting uplink communications between one or more UEs and a network device).

In some instances, it may be beneficial for an onsite cell or the like to be associated with a different ratio of uplink and downlink traffic than a ratio provided by a macrocell. For example, an onsite cell may be associated with more uplink traffic than a macrocell (e.g., the onsite cell may be considered to be more uplink-centric than a macrocell). Accordingly, it may be beneficial for the onsite cell to operate with a higher ratio of uplink to downlink slots and/or symbols than a ratio of uplink to downlink slots and/or symbols associated with a macrocell. For example, in some cases a macrocell may be associated with a downlink-centric TDD slot pattern (sometimes referred to as a 4:1 ratio TDD slot pattern and/or a downlink-biased TDD slot pattern), which may include a repeating pattern of five slots including three downlink slots (e.g., slots in which the associated symbols may be scheduled for downlink communications), one special slot (e.g., a slot which contains a mixture of downlink and uplink symbols, such as ten downlink symbols, a two symbol guard period, and two uplink symbols, among other examples, which is described in more detail below in connection with reference number 142), and one uplink slot (e.g., a slot in which the associated symbols may be scheduled for uplink communications). This 4:1 ratio TDD slot pattern is sometimes referred to as a DDDSU slot pattern, in which "D" used to signify downlink slots, "S" used to signify the special slot, and "U" used to signify the uplink slots. An onsite cell, however, may be associated with an uplink-centric TDD slot pattern (sometimes referred to as a 1:1 ratio TDD slot pattern and/or an uplink-biased TDD slot pattern), which may include a repeating pattern of five slots including two downlink slots, one special slot, and two uplink slots. This 1:1 ratio TDD slot pattern is sometimes referred to as a DDSUU slot pattern.

Operating an onsite cell with a different TDD slot pattern than a macrocell may be problematic if the onsite cell is operated within or near a macrocell and is operating in the same or adjacent spectrum. This is because interference may occur at a TDD boundary region between the two cells (e.g., an area in which coverage from the onsite cell overlaps with coverage from the macrocell, an area in which a UE receives and/or measures signals or interference from multiple network entities operating via different TDD slot patterns (such as two or more network devices and/or other UEs), and/or a similar area or region in which conflicting TDD slot patterns may be received and/or measured by a network entity). More particularly, UEs operating in a TDD boundary region may experience degraded performance due to uplink/downlink collisions in overlapping slots or symbols from the different systems. Thus, typically an onsite cell operating near or within a macrocell will operate using the same TDD slot pattern as the neighboring macrocell in order to avoid uplink/downlink collisions and similar interference within a TDD boundary region. As a result, the onsite cell is operated with a suboptimal TDD slot pattern (e.g., using less uplink slots or symbols than would otherwise be ideal), leading to increased latency, decreased throughput, and overall inefficient usage of network resources.

Some implementations described herein enable the use of different TDD slot patterns in neighboring and/or overlapping cells, such as an onsite cell and a macrocell. In some implementations, an onsite cell may operate with an uplink-centric TDD slot pattern, such as a 1:1 ratio slot pattern or the like, and the macrocell may operate with a downlink-centric TDD slot pattern, such as a 4:1 ratio slot pattern or the like. In order to avoid uplink/downlink collisions and similar performance degradation within a TDD boundary region of overlapping coverage provided by the two cells, a boundary cell may be implemented between the onsite cell and the macrocell that employs a TDD slot pattern aimed at minimizing interference between onsite cell communications and macrocell communications. More particularly, a network device may determine when a UE is operating in the coverage of boundary cell, and the network device may schedule communications in the coverage of the boundary cell by avoiding slots or symbols in which uplink slots or symbols of the onsite cell TDD slot pattern overlap with downlink slots or symbols of the macrocell TDD slot pattern (sometimes referred to as contention slots and/or symbols). Put another way, the network device may sacrifice the contention slots and/or symbols within the coverage of the boundary cell in order to avoid conflict between uplink and downlink communications. As a result, the onsite cell and the macrocell may implement an optimized TDD slot pattern for the respective cell's traffic, such as an uplink-centric TDD slot pattern for the onsite cell and a downlink-centric TDD slot pattern for the macrocell, while avoiding uplink/downlink collisions and similar interference in the TDD boundary region, resulting in decreased latency, increased throughput, decreased communication error rates, and overall more efficient usage of network resources.

Some other implementations described herein enable the use of a boundary region TDD slot pattern and/or an adjusted uplink transmission scheme for a UE operating in a TDD boundary region associated with receiving and/or measuring signals or interference from two or more of cells (downlink signals) and/or other UEs (uplink signals) operating with different TDD slot patterns. In some implementations, in order to avoid uplink/downlink collisions and similar performance degradation within the TDD boundary region, the UE may refrain from transmitting uplink communications in certain slots or symbols. More particularly, the UE may determine that the UE is operating in a TDD boundary region where the first cell is operating with a first TDD slot pattern and the second cell is operating with a second TDD slot pattern different from the first TDD slot pattern. Based on the above knowledge of the TDD boundary region inferred by the UE, the UE and/or the network device to which the UE is connected (e.g., a serving gNB) may determine a boundary region TDD slot pattern (e.g., an alternative TDD slot pattern) to be used for communications in this region based on at least one of the first TDD slot pattern or the second TDD slot pattern, such as by having the UE refraining from transmitting a communication in certain uplink slots and/or symbols. Put another way, the UE may refrain from using contention slots and/or symbols within the TDD boundary region in order to avoid conflict between uplink and downlink communications. As a result, the various cells may implement an optimized TDD slot pattern for the respective cell's traffic, such as an uplink-centric TDD slot pattern for an onsite cell and a downlink-centric TDD slot pattern for the macrocell, while avoiding uplink/downlink collisions and similar interference in the TDD boundary region, resulting in decreased latency, increased throughput, decreased communication error rates, and overall more efficient usage of network resources. This may be better understood with reference to the following figures.

FIGS. 1A-1G are diagrams of an example 100 associated with a TDD slot pattern determination. As shown in FIGS. 1A-1G, example 100 includes multiple network devices, such as an onsite network device 105 and a macro network device 110, and a UE 115.

As shown in FIG. 1A, various network devices may provide coverage to UEs or similar devices as part of a wireless network. More particularly, in the depicted example, the onsite network device 105 may be associated with an onsite cell 120, and the macro network device 110 may be associated with a macrocell 125. As described above, the onsite network device 105 may be associated with a microcell, a picocell, a femtocell, an onsite cell, a private cell, and/or a similar cell that provides coverage to a relatively small number of subscribers within a building, on a certain premises, or the like, while the macro network device 110 may be associated with the macrocell 125 that provides coverage to a broad geographic area and to a relatively large number of subscribers.

In some implementations, coverage provided by the onsite cell 120 may at least partially overlap with coverage provided by the macrocell 125. For example, in a TDD boundary region provided between the onsite cell 120 and the macrocell 125, coverage provided by the onsite cell 120 may overlap with coverage provided by the macrocell 125. Put another way, the UE 115 or another device may be capable of communicating with both the onsite network device 105 and the macro network device 110 when in the TDD boundary region. As described above, in aspects in which a TDD slot pattern associated with the onsite cell 120 differs from a TDD slot pattern associated with the macrocell 125, there is a risk of colliding communications within the TDD boundary region. According, in some implementations, a boundary cell 130 provides coverage to UEs 115 when in a TDD boundary region between the onsite cell 120 and the macrocell 125. The boundary cell 130 may be associated with a TDD slot pattern that minimizes interference that may otherwise be caused in the TDD boundary region by the different TDD slot patterns used in the onsite cell 120 and the macrocell 125, which is described in more detail, below. In some aspects, one of the onsite network device 105 or the macro network device 110 may serve the boundary cell 130, while, in some other aspects, another network device may serve the boundary cell 130, such as network device 132. In some implementations, network device 132 may be a gNB, an eNB, or a similar network device. In some other implementations, network device 132 may be a repeater device, such as a smart repeater or the like, which is described in more detail below.

As further shown in FIG. 1A, one of the onsite network device 105 or the macro network device 110 may provide coverage to the UE 115. More particularly, in the example depicted in FIG. 1A, the UE 115 is located within the onsite cell 120. In this way, the UE 115 may be connected to a core network or the like via the coverage provided by the onsite network device 105 (e.g., via the onsite cell 120). In that regard, the UE 115 may communicate with the onsite network device 105 using a first TDD slot pattern associated with the onsite network device 105 and/or the onsite cell 120. In some implementations, the onsite cell 120 may be associated with an uplink-centric TDD slot pattern, which may differ from a TDD slot pattern associated with the macro network device 110 and/or the macrocell 125, as described above. For example, the onsite cell 120 may be associated with a 1:1 ratio TDD slot pattern (e.g., a DDSUU slot pattern), as described above. This may be more readily understood with reference to FIG. 1B.

Figure 1B:
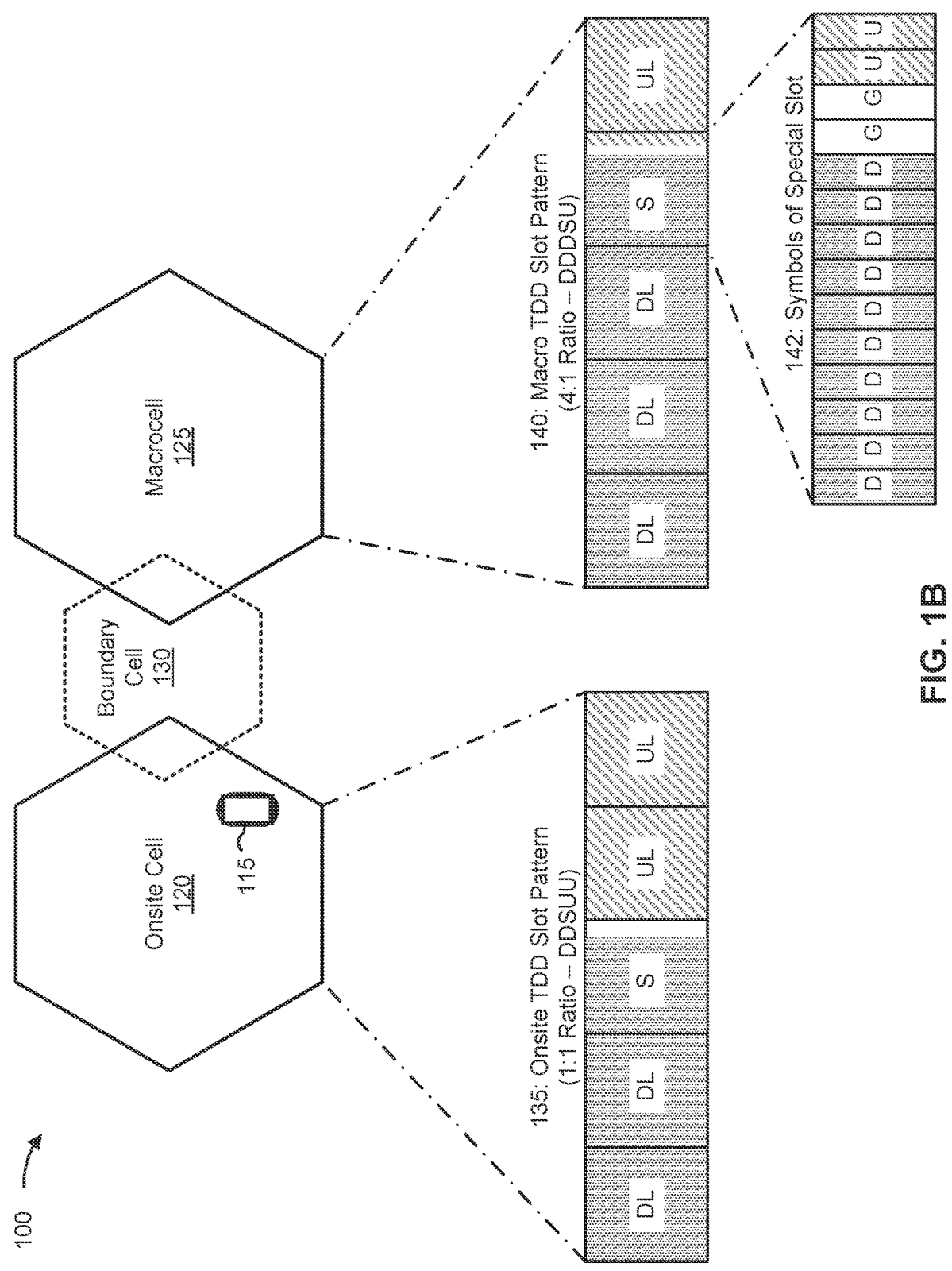

As shown in FIG. 1B, the onsite cell 120 may be associated with a first TDD slot pattern (sometimes referred to as an onsite TDD slot pattern) 135. In the depicted example, the onsite TDD slot pattern 135 is an uplink-centric slot pattern, and, more particularly, is a 1:1 ratio TDD slot pattern (e.g., a DDSUU slot pattern). However, in some other implementations, the onsite TDD slot pattern 135 may differ from the specific combination of uplink, downlink, and special slots shown in FIG. 1B without departing from the scope of the disclosure. As shown using stippling in FIG. 1B, the first two slots of the repeating five-slot pattern may be reserved for downlink communications or otherwise associated with downlink communications (and thus, as shown, may be referred to as downlink, or "DL," slots). Put another way, each of the first two slots may include a number (e.g., fourteen) of OFDM symbols (which is be described in more detail in connection with reference number 142), and the symbols in each of the first two slots may be scheduled for downlink communications. The third slot of the repeating five-slot pattern may be a special slot. As described, a special slot may contain a mixture of downlink and uplink symbols. In some implementations, however, the special slot may nonetheless include more downlink symbols than uplink symbols (e.g., the special slot may include ten downlink symbols, a two symbol guard period, and two uplink symbols, as shown by reference number 142, among other examples), and thus the special slot associated with the onsite TDD slot pattern 135 is also shown using stippling in FIG. 1B to signify that the special slot is a downlink-centric slot. Moreover, a portion of the special slot in the onsite TDD slot pattern 135 is left blank (e.g., is shown with neither stippling nor cross-hatching), which may correspond to one or more symbols comprising a guard band separating downlink communications and uplink communications. As shown using cross-hatching in FIG. 1B, the final two slots of the repeating five-slot pattern may be reserved for uplink communications or otherwise associated with uplink communications (and thus, as shown, may be referred to as uplink, or "UL," slots). Put another way, the symbols in each of the final two slots may be granted to the UE 115 to be used for uplink communications.

As further shown in FIG. 1B, the macrocell 125 may be associated with a second TDD slot pattern, sometimes referred to as a macro TDD slot pattern 140, which may be different from the onsite TDD slot pattern 135. In the depicted example, the macro TDD slot pattern 140 is a downlink-centric slot pattern, and, more particularly, is a 4:1 ratio TDD slot pattern (e.g., a DDDSU slot pattern). However, in some other implementations, the macro TDD slot pattern 140 may differ from the specific combination of uplink, downlink, and special slots shown in FIG. 1B without departing from the scope of the disclosure. In this example, the first three slots of the repeating five-slot pattern may be reserved for downlink communications or otherwise associated with downlink communications. The fourth slot of the repeating five-slot pattern may be a special slot. As shown by reference number 142, the special slot may include a number (e.g., fourteen) of OFDM symbols, with a majority of the symbols being downlink symbols. More particularly, as shown using stippling and labeled with "D," the first ten symbols of the special slot associated with the macro TDD slot pattern 140 may be downlink symbols, but the special slot may also include one or more symbols used as a guard band (such as the two symbols shown with no stippling or cross-hatching and labeled with "G") and/or uplink symbols (such as the two symbols shown using cross-hatching and labeled with "U"). And the final slot of the repeating five-slot pattern may be reserved for uplink communications or otherwise associated with uplink communications.

When the UE 115 is within one coverage area, but not within the coverage of the boundary cell 130, the UE 115 may communicate using the onsite TDD slot pattern 135 or the macro TDD slot pattern 140 with little risk of colliding communications and similar interference. For example, as shown in FIG. 1B, the UE 115 is within the onsite cell 120, and is not within the coverage of the boundary cell 130 or the macrocell 125. In some aspects, a UE 115 may determine that it is within one cell (e.g., the onsite cell 120 or the macrocell 125) and not the boundary cell 130 by detecting and/or receiving control signaling, broadcast singling, or the like applicable to one of the onsite cell 120 or the macrocell 125 without detecting or receiving any such control signaling, broadcast singling, or the like applicable to the other one of the onsite cell 120 or the macrocell 125 and/or applicable to the boundary cell 130. In such implementations, the UE 115 may communicate with the onsite network device 105 using the onsite TDD slot pattern 135. In this way, the onsite network device 105 may implement an uplink-centric TDD slot pattern, which may be more reflective of typical traffic within the onsite cell 120. As the UE 115 moves into overlapping coverage, however, such as within the coverage of the boundary cell 130, there is more risk of colliding communications. This may be more readily understood with reference to FIG. 1C.

Figure 1C:
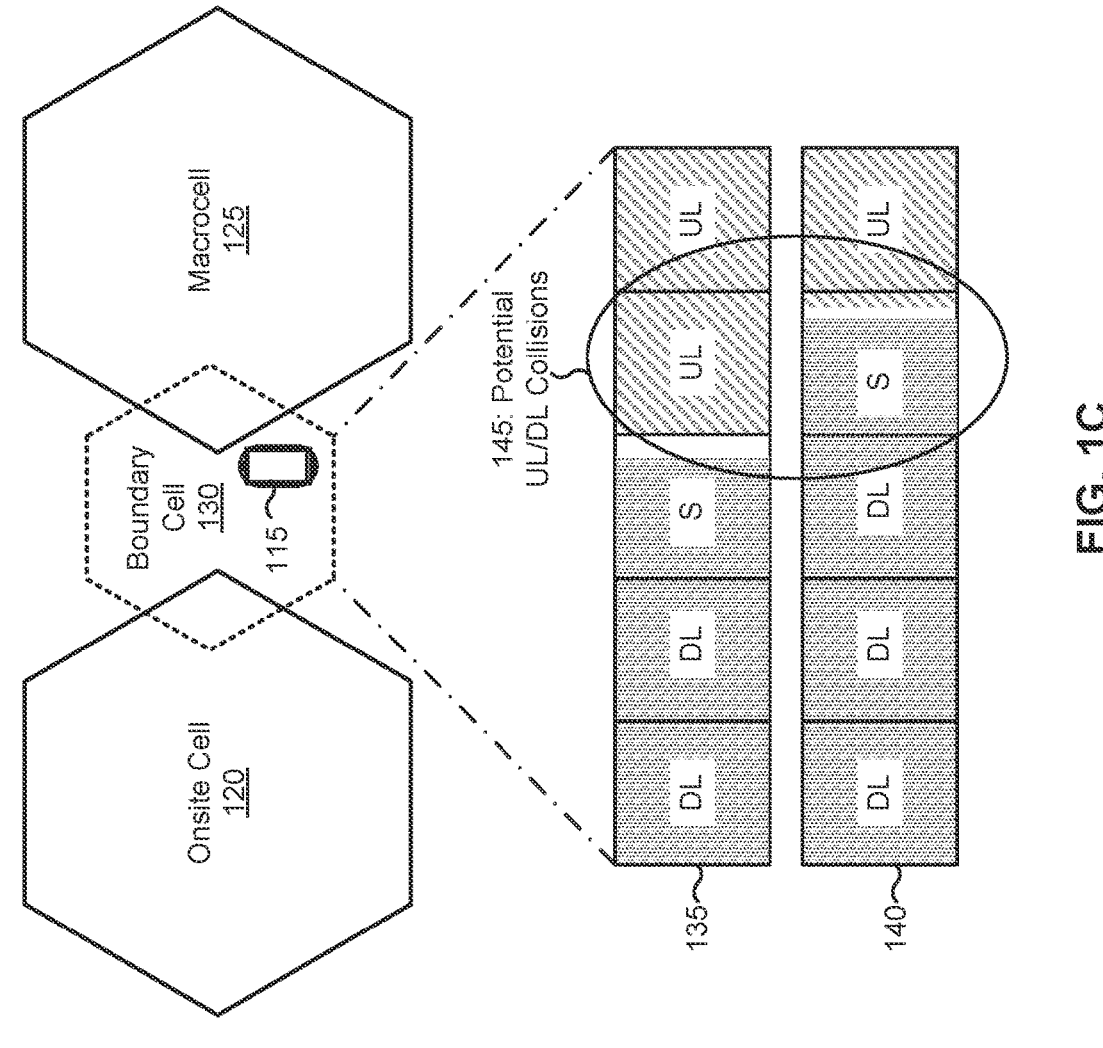

As shown in FIG. 1C, the UE 115 is within the coverage of the boundary cell 130, which may be associated with an area of overlapping coverage provided by the onsite cell 120 and the macrocell 125. Put another way, when the UE 115 is within the coverage of the boundary cell 130, the UE 115 may be capable of communicating with both the onsite network device 105 and the macro network device 110. As described above, this may potentially result in uplink/downlink collisions and other interference or service degradation. More particularly, as shown by reference number 145, when the UE 115 is within the coverage of the boundary cell 130 there are potential uplink/downlink collisions in the fourth slot of the five-slot repeating pattern of the onsite TDD slot pattern 135 and the macro TDD slot pattern 140. More particularly, the UE 115 or another device may attempt to transmit an uplink communication to the onsite network device 105 at a same time (e.g., within a same slot) that the macro network device 110 is transmitting a downlink communication, either to the UE 115 or to another device, which may collide and result in performance degradation. Accordingly, in some aspects, communications between the UE 115 and one of the network devices 105, 110, 132 may be selectively scheduled in an effort to avoid uplink/downlink collisions within a contention slot or symbol, which may be more readily understood with reference to FIG. 1D.

Figure 1D:
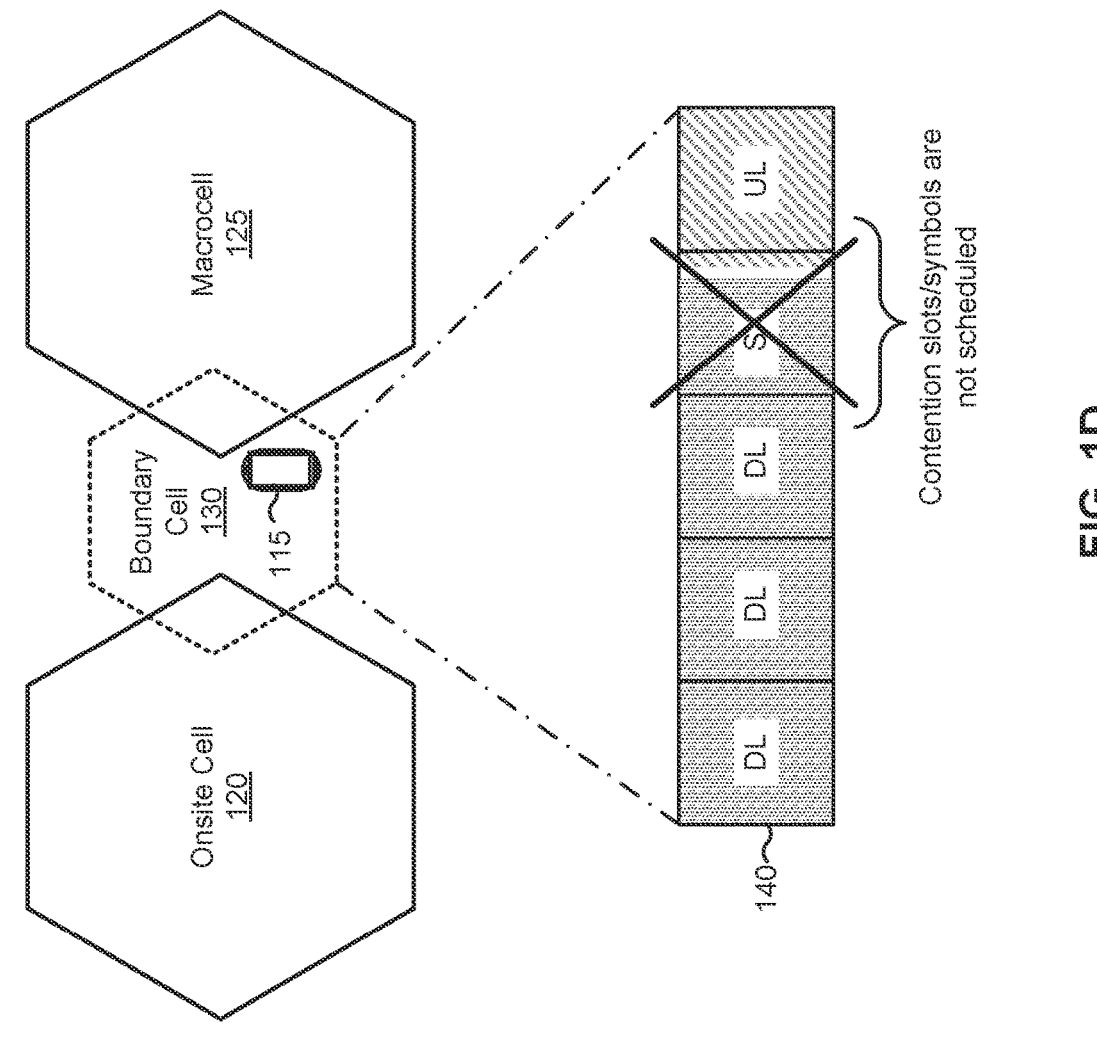

As shown in FIG. 1D, in some implementations, when the UE 115 is within the coverage of the boundary cell 130, the UE 115 may communicate using one of the onsite TDD slot pattern 135 or the macro TDD slot pattern 140, but one or more contention slots or symbols may not be granted or scheduled in order to avoid uplink/downlink collisions, or the like. More particularly, in some aspects, a network device (e.g., one of the onsite network device 105, the macro network device 110, the network device 132, or another network device such as another gNB or another eNB) may determine that the UE 115 is operating in a TDD boundary region associated with overlapping coverage provided by the macrocell 125 and the onsite cell 120. For example, the network device may determine that the UE 115 is operating within the coverage of the boundary cell 130, as shown in FIG. 1D. Moreover, the network device may determine that a first TDD slot pattern associated with the macrocell 125 (e.g., the macro TDD slot pattern 140) differs from a second TDD slot pattern associated with the onsite cell 120 (e.g., the onsite TDD slot pattern 135).

Accordingly, the network device may determine a boundary region TDD slot pattern to be used for communications with the UE 115 within the coverage of the boundary cell 130 based on at least one of the first TDD slot pattern or the second TDD slot pattern. More particularly, in some implementations, at least one uplink symbol of one of the first TDD slot pattern or the second TDD slot pattern overlaps with at least one downlink symbol of the other one of the first TDD slot pattern or the second TDD slot pattern, as described in connection with reference number 145 in FIG. 1C. Accordingly, the network device may determine a boundary region TDD slot pattern to be used in order to avoid uplink/downlink collisions in the contention slots or symbols. More particularly, when communicating with the UE 115 using the boundary region TDD slot pattern, the network device may not grant an uplink communication in the at least one uplink symbol (e.g., the at least one contention symbol) and/or may not schedule a downlink communication in the at least one downlink symbol. In this way, the network device may sacrifice capacity in the TDD boundary region in an effort to avoid conflict. For example, in networks implementing the onsite TDD slot pattern 135 and the macro TDD slot pattern 140 described above, when a device (e.g., the UE 115) moves from the onsite cell 120 to the boundary cell 130, the device may lose 50% uplink capacity because the first uplink slot of the onsite TDD slot pattern 135 may no longer be granted in coverage of the boundary cell 130. Conversely, when a device moves from the boundary cell 130 to the onsite cell 120, the device may gain 100% uplink capacity because a previously unscheduled or granted slot (e.g., the fourth slot of the five-slot repeating pattern) may then be granted as an uplink slot. Similarly, when a device moves from the macrocell 125 to the boundary cell 130, the device may lose 25% of its downlink capacity because the last downlink slot of the macro TDD slot pattern 140 may no longer be granted in the coverage of the boundary cell 130. Conversely, when a device moves from the boundary cell 130 to the macrocell 125, the device may gain 33% downlink capacity because a previously unscheduled or granted slot (e.g., the fourth slot of the five-slot repeating pattern) may then be scheduled as a downlink slot.

In some implementations, the network device may implement the above-described boundary region TDD slot pattern within the coverage of the boundary cell 130 even when there is little risk of collisions at a particular UE (e.g., UE 115), such as when there are other UEs within the coverage of the boundary cell 130 that are at risk of experiencing colliding communications. More particularly, in some implementations, due to a particular location of the UE 115 within the coverage of the boundary cell, UE-specific implementations, UE capabilities, or the like, the UE 115 may be capable of communicating in the coverage of the boundary cell 130 using one of the onsite TDD slot pattern 135 or the macro slot pattern 140 with little risk of colliding communications. Nonetheless, if multiple UEs are being served within the coverage of the boundary cell 130, with at least one of the UEs being at risk of experiencing colliding communications, the network device may implement a modified TDD slot pattern (e.g., the boundary region TDD slot pattern) within the coverage of the boundary cell 130, thereby serving all UEs within the cell using the modified TDD slot pattern (including, in this example, the UE 115 which is at little risk of experiencing colliding communications). Put another way, in some implementations, even if the UE 115 would face no issues using one of the onsite TDD slot pattern 135 or the macro TDD slot pattern 140 in the coverage of the boundary cell 130, the boundary region TDD slot pattern may be dictated by other UEs in different parts of the boundary cell 130. In that regard, in some implementations, the network device may determine that one or more additional UEs are operating in the coverage of the boundary cell 130, and thus may further determine the boundary region TDD slot pattern to be used for communications with the UE 115 within the coverage of the boundary cell 130 based on the one or more additional UEs operating in the coverage of the boundary cell.

In some implementations, the boundary region TDD slot pattern may be the same as one of the first TDD slot pattern or the second TDD slot pattern (e.g., may be the same as either the onsite TDD slot pattern 135 or the macro TDD slot pattern 140). For example, as shown in FIG. 1D, the network device may communicate with the UE 115 using the macro TDD slot pattern 140. Put another way, the slot pattern depicted in FIG. 1D is the same TDD slot pattern associated with the macrocell 125. In such implementations, the network device may not schedule communications in certain downlink slots or symbols that overlap with uplink slots or symbols of the onsite TDD slot pattern 135. For example, as shown using an X through the special slot, which includes downlink symbols that overlap with uplink symbols of the onsite TDD slot pattern 135, the network device may not schedule any downlink communications in the special slot in order to avoid collisions with uplink communications from various UEs or other devices communicating with the onsite network device 105.

Figure 1E:
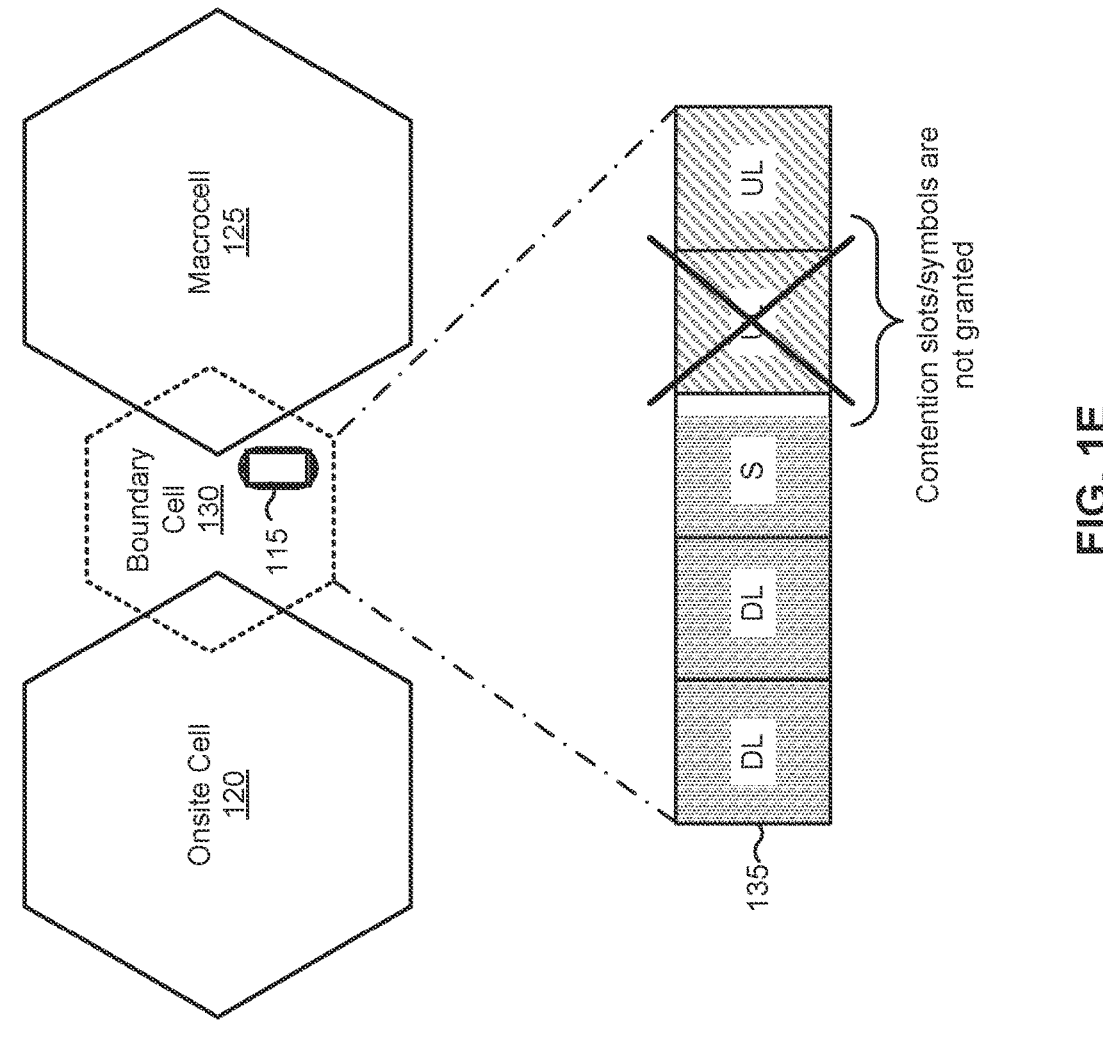

Alternatively, as shown in FIG. 1E, the network device may communicate with the UE 115 using the onsite TDD slot pattern 135. Put another way, the slot pattern depicted in FIG. 1E is the same TDD slot pattern associated with the onsite cell 120. In such implementations, the network device may not grant certain uplink slots or symbols that overlap with downlink slots or symbols of the macro TDD slot pattern 140. For example, as shown using an X through the first uplink slot, which includes uplink symbols that overlap with downlink symbols of the macro TDD slot pattern 140, the network device may not grant any symbols in the fourth slot for use for uplink communications in order to avoid collisions with downlink communications from the macro network device 110 to various UEs or other devices.

Figure 1F:
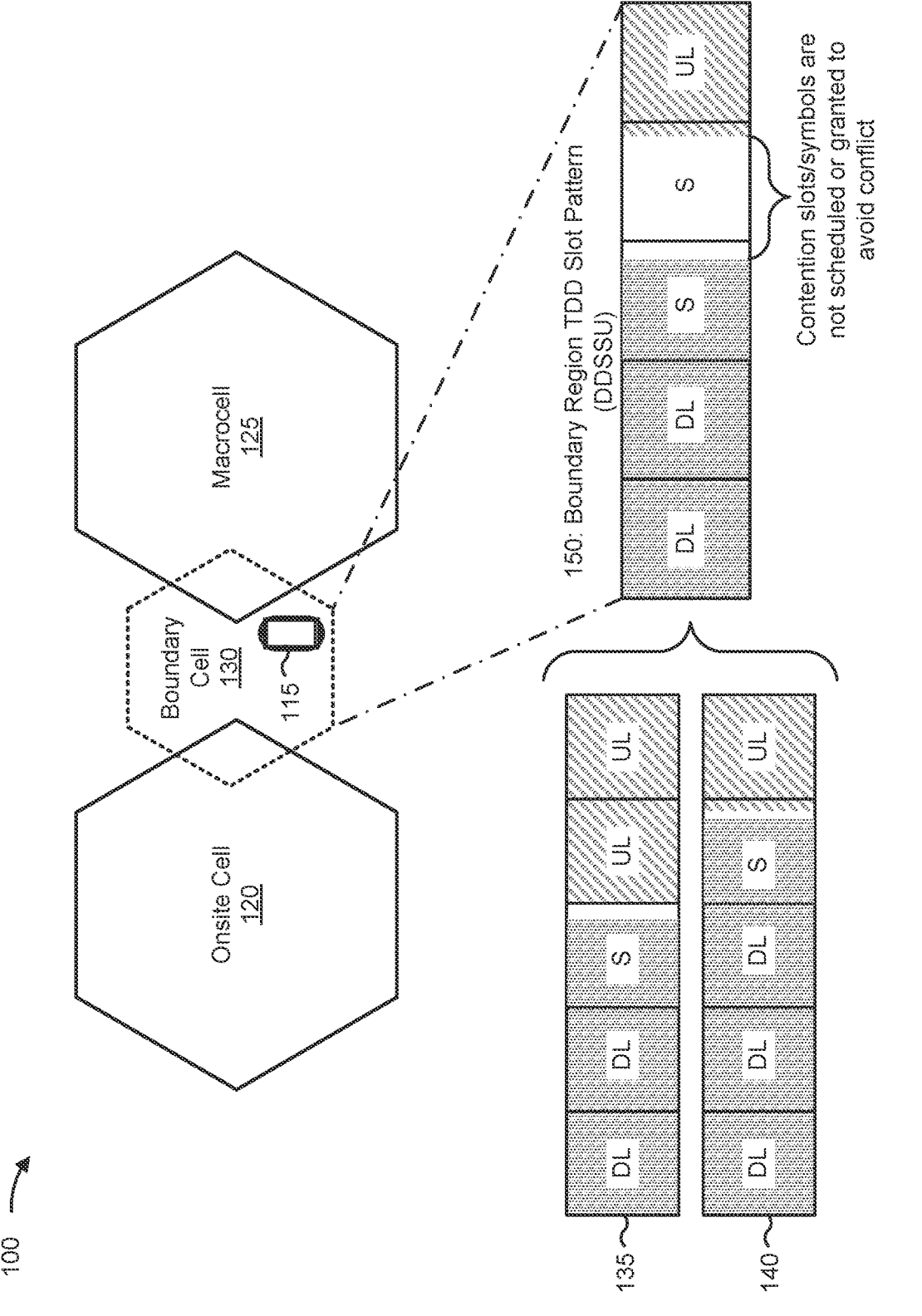

In some implementations, when the UE 115 is within the TDD boundary region (e.g., the boundary cell 130), the network device may communicate with the UE 115 using a different TDD slot pattern from the first TDD slot pattern and the second TDD slot pattern. For example, as shown in FIG. 1F, the network device may communicate with the UE 115 using a first boundary region TDD slot pattern 150, or the like. The first boundary region TDD slot pattern 150 may include a different pattern than the first TDD slot pattern and the second TDD slot pattern (e.g., the onsite TDD slot pattern 135 and the macro TDD slot pattern 140). More particularly, in the depicted example, the first boundary region TDD slot pattern 150 may include two downlink slots, two special slots, and one uplink slot (e.g., the first boundary region TDD slot pattern 150 may include a five-slot repeating pattern of DDSSU). Moreover, in some aspects, symbols in one or more of the special slots may not be scheduled and/or may not be granted in order to avoid uplink/downlink collisions in contention slots and/or symbols. For example, as shown in FIG. 1F, portions of the both the first special slot and the second special slot are not scheduled or granted in order to avoid uplink/downlink collisions, essentially creating a large guard band between the last scheduled downlink symbol and the first granted uplink symbol in the first boundary region TDD slot pattern 150.

Figure 1G:
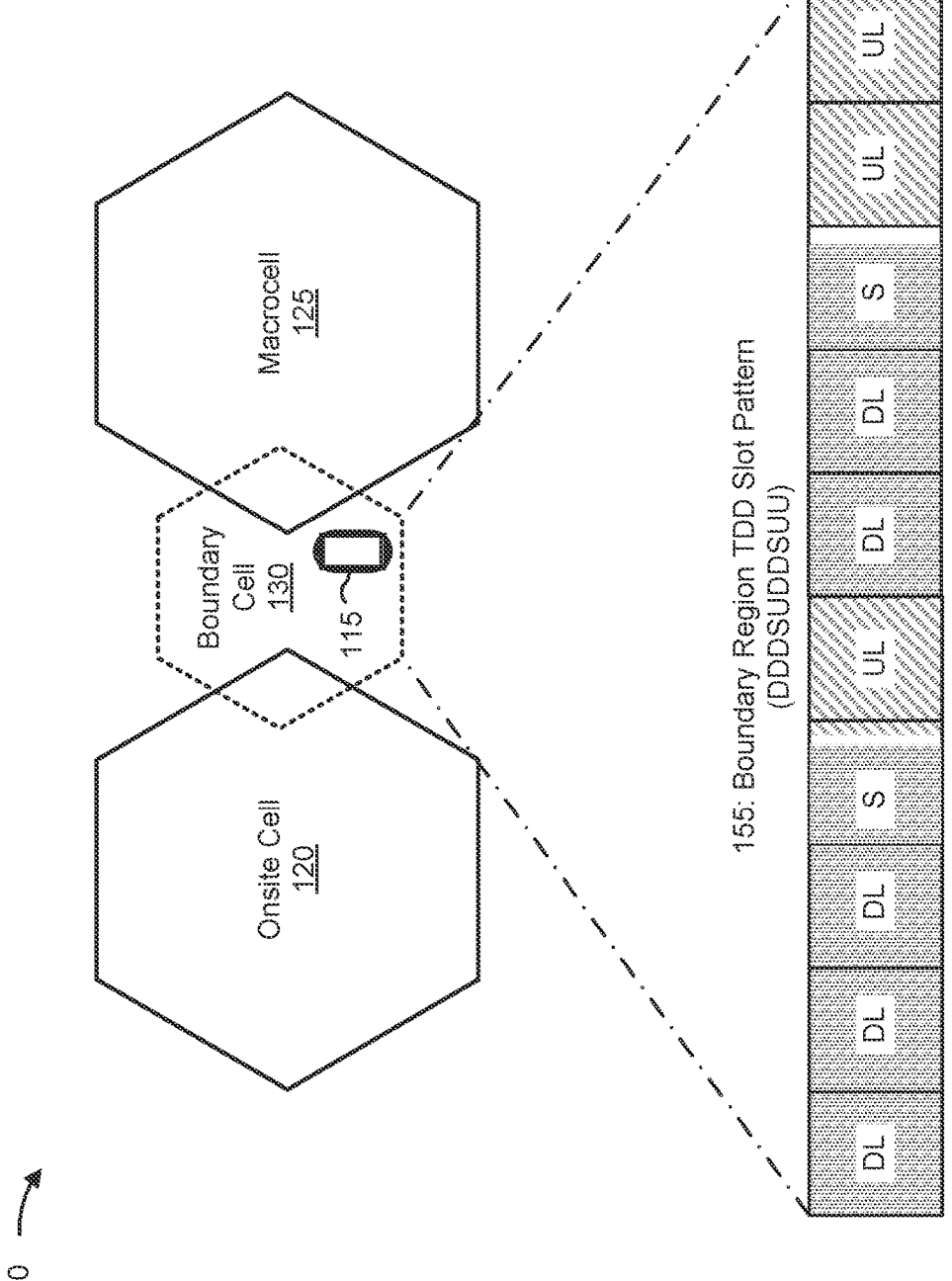

In some implementations, a boundary TDD slot pattern may be based on a combination of the first TDD slot pattern (e.g., the macro TDD slot pattern 140) and the second TDD slot pattern (e.g., the onsite TDD slot pattern 135). For example, as shown in FIG. 1G, a second boundary region TDD slot pattern 155 includes a ten-slot repeating pattern of DDDSUDDSUU. The second boundary region TDD slot pattern 155 may be a combination of the onsite TDD slot pattern 135 and the macro TDD slot pattern 140 in that the first five slots (e.g., DDDSU) correspond to the 4:1 ratio macro TDD slot pattern 140 and the second five slots (e.g., DDSUU) correspond to the 1:1 ratio onsite TDD slot pattern 135. In some implementations, the network device may operate using the second boundary region TDD slot pattern 155, and thereafter may not schedule and/or grant certain slots or symbols when needed and/or when collisions arise. For example, the network device may operate using the second boundary region TDD slot pattern 155 (e.g., DDD-SUDDSUU), but in response to later determining that collisions occur within the fourth and/or ninth slots thereof (either at the UE 115 and/or at another UE operating in the coverage of the boundary cell 130), the network device may thereafter refrain from scheduling and/or granting certain slots or symbols in the fourth and/or ninth slots (in a similar manner as described in connection with FIGS. 1D and 1E, respectively) in order to avoid conflict in those slots and/or symbols.

In some implementations, the network device may determine that the UE 115 is operating within the TDD boundary region (e.g., that the UE 115 is within the coverage of the boundary cell 130) based on a location of the UE 115, based on signaling from the UE 115, and/or based on signaling from another device. For example, in some implementations, the TDD boundary region may be statically determined. More particularly, one or more of the network devices (e.g., the onsite network device 105, the macro network device 110, and/or a similar network device) may be pre-provisioned with a site plan or the like, which indicates certain areas of overlapping coverage and/or certain areas in which a boundary region TDD slot pattern should be utilized. Accordingly, based on detecting that a location of the UE 115 is within an area of overlapping coverage (e.g., is within the coverage of the boundary cell 130), a network device may implement one of the TDD slot patterns described in connection with FIGS. 1D-1G, or a similar TDD slot pattern.

In some other implementations, the TDD boundary region may be dynamically determined. For example, in some implementations, a receiver within a cell (e.g., a receiver at the onsite network device 105 and/or the macro network device 110) may listen for various signals, determine a hearable pattern at a site, and adjust into a boundary region TDD slot pattern, as appropriate. In some other implementations, a receiver may be located at the UE 115, which may then, in response to hearing multiple transmission patterns, signal an indication to a network device 105, 110 that the UE 115 is within the TDD boundary region. In some implementations, one network device (e.g., one of the onsite network device 105 or the macro network device 110) may signal to another network device (e.g., the other one of the onsite network device 105 or the macro network device 110) that a UE 115 is within a TDD boundary region, such as via an Xn communication protocol and/or other inter-network-device communication protocol. For example, if an onsite network device 105 determines that a UE 115 is within a TDD boundary region, the onsite network device 105 may signal, to the macro network device 110, that the UE 115 is within the TDD boundary region, and thus the macro network device 110 may thereafter schedule and grant downlink and uplink resources according to a boundary region TDD slot pattern, or the like.

In some other implementations, an external device (e.g., network device 132) may determine that the UE 115 is within a TDD boundary region, and thus the external device may signal an indication that the UE 115 is within the TDD boundary region to one of the network devices 105, 110. In some implementations, the external device may be a smart repeater device, or the like. In some aspects, a smart repeater device may be capable of listening for and/or determining transmission patterns (e.g., uplink and downlink patterns), and thus may transmit communications (e.g., repeat communications) when the communications will cause the least interference with other devices' transmissions. In such implementations, a smart repeater may be capable of determining that a UE 115 is within the TDD boundary region by listening to the various transmissions or otherwise, and thus may signal to one or more of the network devices 105, 110 that the UE 115 is within a TDD boundary region using an inter-gNB communication protocol or a similar communication protocol, such as by utilizing an over-the-air control channel between a donor gNB and a subtending smart repeater used to transmit control information, sometimes referred to as Side Control Information. Moreover, in some implementations, the TDD boundary region may be dynamically determined using an artificial intelligence (AI) algorithm, or the like, which may optimally determine whether a TDD slot pattern adjustment is necessary and/or an optimal TDD slot pattern to implement in order to best avoid uplink/downlink collisions, or the like.

Although the above examples are described in connection with a single TDD boundary region (e.g., the boundary cell 130), aspects of the disclosure are not so limited. In some other implementations, there may be multiple boundary cells, and each boundary cell may be associated with a different boundary region TDD slot pattern. For example, when the UE 115 is within the coverage of the boundary cell 130 (e.g., when the UE 115 is in a connected state in the coverage of the boundary cell 130), the network device servicing the boundary cell 130 may operate with a first TDD slot pattern (such as the macro TDD slot pattern 140, as described in connection with FIG. 1D), when the UE 115 is within a second boundary cell, a network device serving the second boundary cell may operate with a second TDD slot pattern (such as the onsite TDD slot pattern 135, as described in connection with FIG. 1E), when the UE 115 is within a third boundary cell, a network device servicing the third boundary cell may operate with a third TDD slot pattern (such as the first boundary region TDD slot pattern 150, as described in connection with FIG. 1D), when the UE 115 is within a fourth boundary cell, a network device servicing the fourth boundary cell may operate with a fourth TDD slot pattern (such as the second boundary region TDD slot pattern 155, as described in connection with FIG. 1G), and so forth. Accordingly, in some implementations, the network device (e.g., one of the onsite network device 105 and the macro network device 110) may determine that the UE 115 is operating in another boundary cell associated with the overlapping coverage provided by the network device and another network device (e.g., the other of the onsite network device 105 and the macro network device 110), may determine another boundary region TDD slot pattern to be used for communications with the UE 115 based on at least one of the first TDD slot pattern or the second TDD slot pattern with the other boundary region TDD slot pattern being different than the boundary region TDD slot pattern, and may communicate with the UE 115 using the other boundary region TDD slot pattern.

Accordingly, aspects of the disclosure enable the use of optimized TDD slot patterns in various coverage areas or cells, such as uplink-centric TDD slot patterns in onsite cells and downlink-centric TDD in macrocells, while avoiding uplink/downlink collisions within coverage of a boundary cell between the cells. This may result in decreased latency, increased throughput, decreased communication error rates, and overall more efficient usage of network resources, as described.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2A:
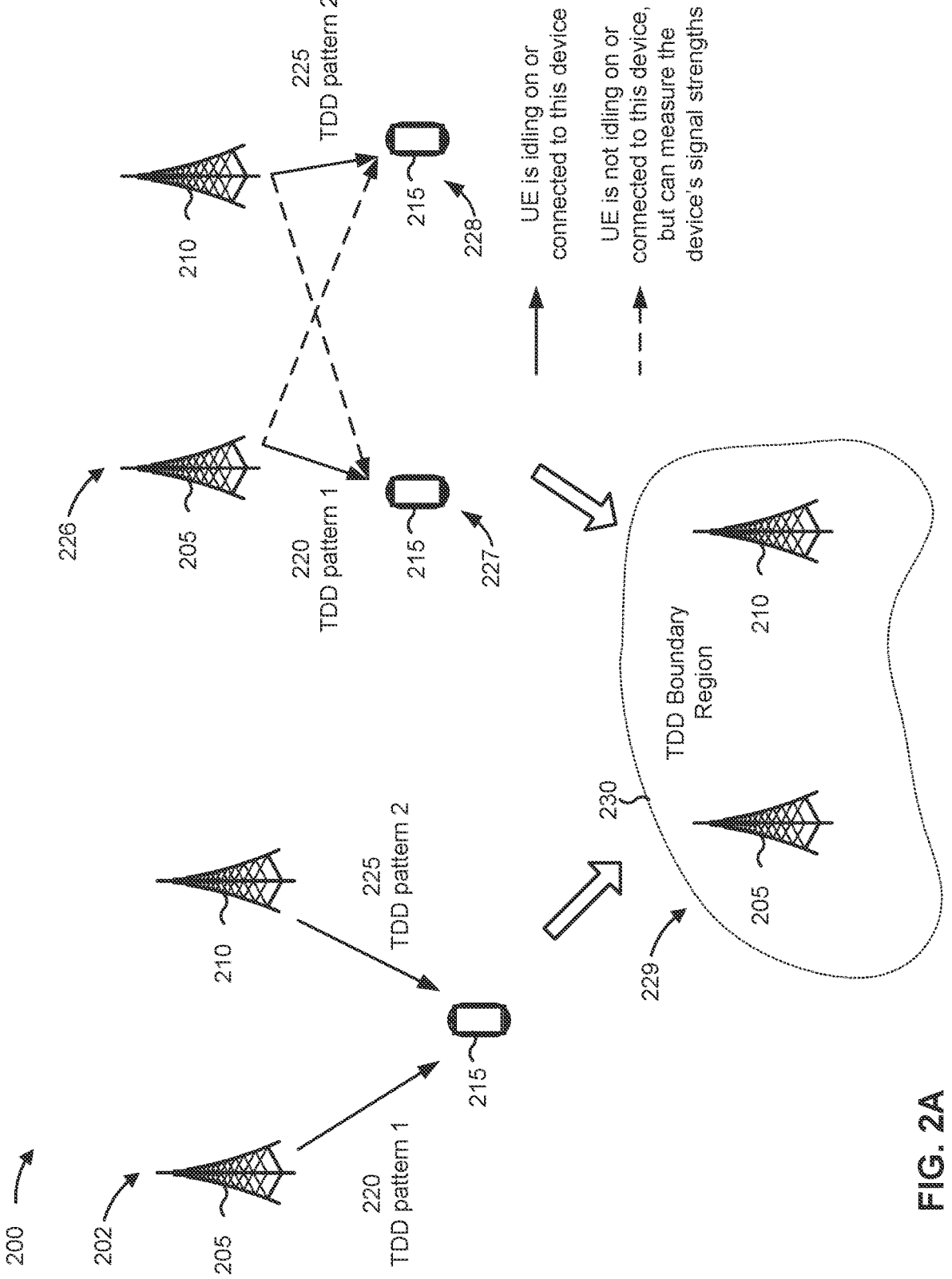
Figure 2B:
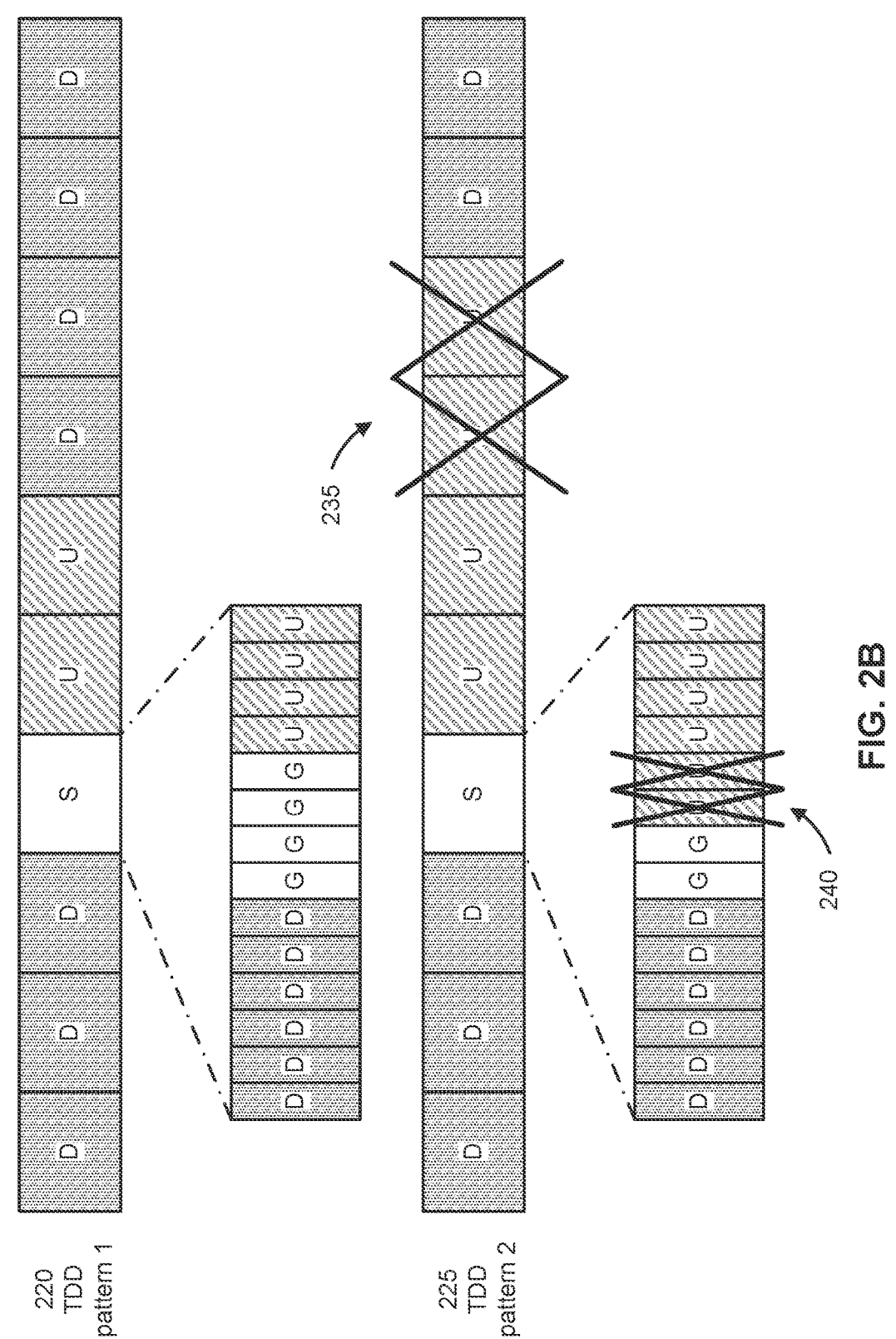
Figure 2C:
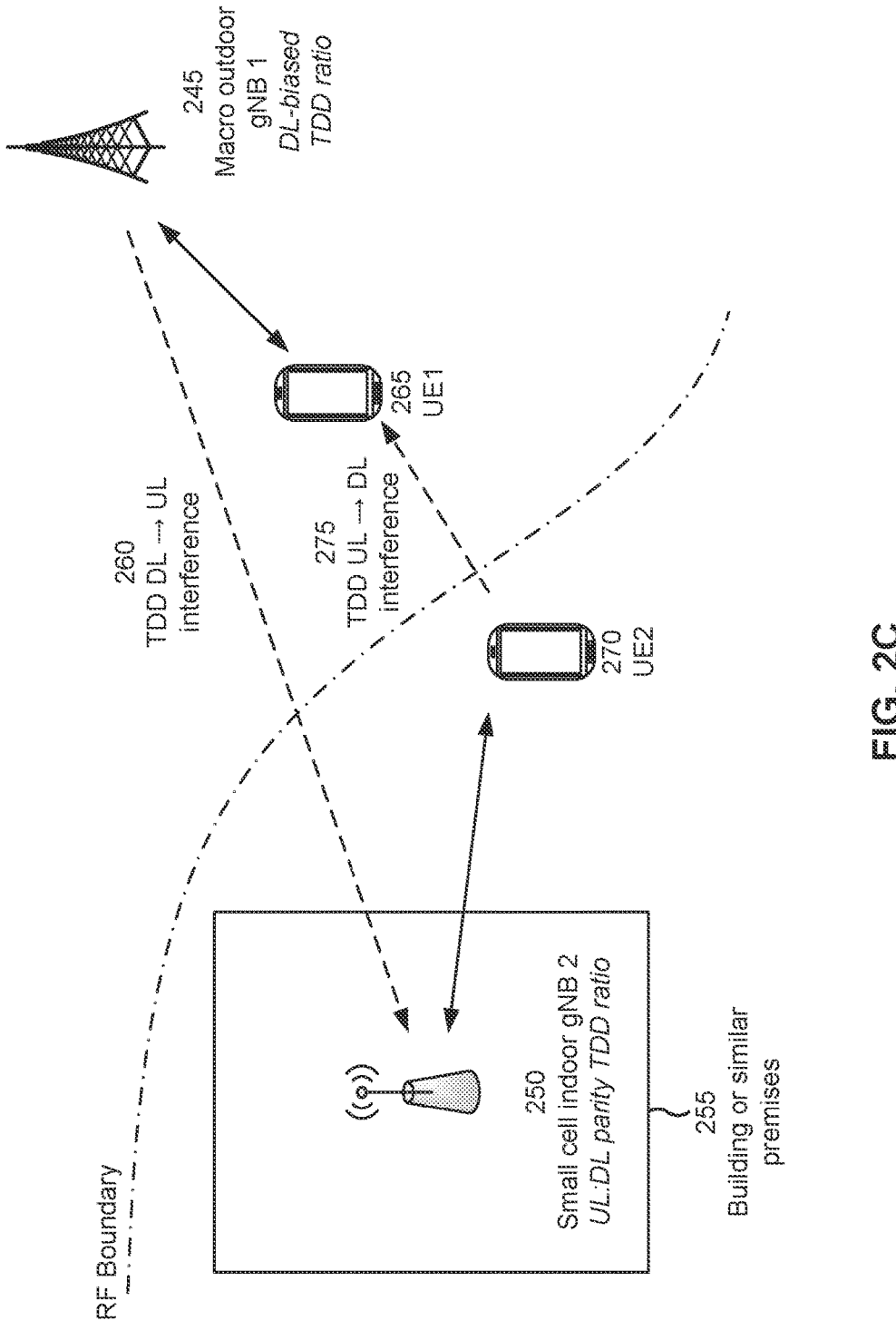

FIGS. 2A-2D are diagrams of another example 200 associated with a TDD slot pattern determination. As shown in FIGS. 2A-2B, example 200 may include a first network device 205, a second network device 210, and a UE 215. Additionally, or alternatively, and as shown in FIGS. 2C-2D, example 200 may include a first network device 245, a second network device 250, a first UE 265, and/or a second UE 270. The first network device 245 and/or the second network device 250 described in connection with FIGS. 2C-2D may correspond to the first network device 205 and/or the second network device 210 described in connection with FIGS. 2A-2B, and/or the first UE 265 and/or the second UE 270 described in connection with FIGS. 2C-2D may correspond to the UE 215 described in connection with FIGS. 2A-2B.

First, as shown in FIGS. 2A-2B, the UE 215 may determine that the UE 215 is operating in a TDD boundary region associated with receiving and/or measuring signals or interference from two or more cells (e.g., cells associated with the first network device 205 and the second network device 210, respectively) operating with different TDD slot patterns, and thus may communicate with the first network device 205 and/or the second network device 210 via a boundary region TDD slot pattern (e.g., an alternative TDD slot pattern) in order to mitigate uplink/downlink collisions or other interference among the UE 215, the network devices 205, 210, one or more other nearby UEs, and/or one or more other nearby network devices. In some implementations, communicating via the boundary region TDD slot pattern may be associated with the UE 215 refraining from communicating via certain slots and/or symbols, such as by refraining from transmitting an uplink communication (e.g., a physical uplink shared channel (PUSCH) communication) in an uplink symbol associated with one of the cells when the uplink symbol overlaps with a downlink symbol, a guard symbol, or a similar symbol associated with the other one of the cells.

In some implementations, the first network device 205 may be associated with a macro network. For example, the first network device 205 may be an outdoor gNB or similar network device. The second network device 210 may be associated with a private network (e.g., an onsite network). For example, the second network device 210 may be a small cell, indoor gNB or similar network device. In such examples, the first cell may be associated with more downlink slots or symbols than the second cell, in a similar manner as described above in connection with FIGS. 1A-1G. More particularly, the first network device 205 and/or the first cell may be associated with a first TDD slot pattern (referred to as "TDD pattern 1" in FIGS. 2A-2D, as indicated by reference number 220), which may be a downlink-biased and/or downlink-centric TDD slot pattern (which is described in more detail in connection with FIG. 2B). The second network device 210 and/or the second cell may be associated with a second TDD slot pattern (referred to as "TDD pattern 2" in FIGS. 2A-2D, as indicated by reference number 225), which may an uplink-centric TDD slot pattern and/or a TDD slot pattern associated with more uplink-to-downlink parity than the first TDD slot pattern (which is described in more detail in connection with FIG. 2B).

As shown by reference number 202, in some implementations, the UE 215 may determine that the UE 215 is operating in a TDD boundary region 230 associated with receiving and/or measuring signals or interference from both the first cell and the second cell (e.g., signals or interference from the first network device 205 and the second network device 210). In a similar manner as described above in connection with FIGS. 1A-1G, the TDD boundary region 230 may be an area of overlapping coverage from two cells, such as an area in which coverage from an onsite cell (e.g., a cell associated with the second network device 210) overlaps with coverage from a macrocell (e.g., a cell associated with the first network device 205) and/or an area in which a network entity (e.g., the UE 215) is capable of detecting signals or interference from multiple cells and/or other network entities (e.g., the onsite cell and the macrocell).

In some implementations, the TDD boundary region 230 may also encompass locations where the signal from either cell is dominant (e.g., the UE 215 would only be idling on or connecting to the particular cell, and not idling on or connecting to the other cell) but the UE 215 may still sense signals or interference from the other cell. For example, as shown by reference number 226, when the UE 215 is in a first location (indicated by reference number 227), the UE 215 may be idling on or connected to the first network device 205 and not the second network device 210, but the UE 215 may nonetheless measure the second network device 210's signal strengths and/or sense interference from the second network device 210. Similarly, when the UE 215 is in a second location (indicated by reference number 228), the UE 215 may be idling on or connected to the second network device 210 and not the first network device 205, but the UE 215 may nonetheless measure the first network device 205's signal strengths and/or sense interference from the first network device 205.

Additionally, the UE 215 may determine that a first TDD slot pattern associated with the first cell (e.g., TDD pattern 1) differs from a second TDD slot pattern associated with the second cell (e.g., TDD pattern 2). Put another way, the UE 215 may determine that the UE 215 is operating in a location in which there is potential for colliding communications or other interference due to at least two cells operating with different TDD slot patterns.

In some implementations, as shown by reference number 229, the UE 215 may determine that the UE 215 is within a TDD boundary region 230 based on decoding the TDD slot pattern signaling from one or more network devices. For example, the UE 215 may determine the first TDD slot pattern based on a first TDD configuration message received from the first network device 205 associated with the first cell, and/or the UE 215 may determine the second TDD slot pattern based on a second TDD configuration message received from the second network device 210 associated with the second cell. More particularly, in some implementations, the TDD slot pattern associated with each cell may be semi-statically configured at the cell level, such as via a common configuration message and/or parameter (sometimes referred to as a tdd-UL-DL-ConfigurationCommon information element (IE)) received via a broadcast message (e.g., contained in a system information block 1 (SIB1) message) from a network device 205, 210 associated with the cell where the UE 215 is idling, and/or such as via the common configuration message and/or parameter (e.g., a tdd-UL-DL-ConfigurationCommon IE) transmitted in a radio resource control (RRC) reconfiguration message from a network device 205, 210 connected to the UE 215. In such implementations, the UE 215 may determine that the UE 215 is within a TDD boundary region 230 by determining that the TDD slot patterns associated with coverage provided by multiple cells within the region differ based on the TDD configuration messages broadcast in the respective cells and/or transmitted to the UE 215 via the various network devices 205, 210.

Additionally, or alternatively, the UE 215 may determine the TDD boundary region 230 and/or that the first TDD slot pattern associated with the first cell providing coverage in the TDD boundary region 230 differs from the second TDD slot pattern associated with the second cell providing covering in the TDD boundary region 230 based on at least one of an interference measurement performed by the UE 215 or a received signal strength measurement performed by the UE 215. More particularly, the UE 215 may periodically measure the received signal strengths, interference levels, or similar measurements on a per-slot and/or per-symbol basis. A high interference level systematically detected on certain downlink slots/symbols may be indicative of some TDD uplink-to-downlink interference from other UEs impacting the UE 215. Similarly, a high interference level systematically detected on certain uplink slots/symbols may be indicative that the UE 215 is potentially causing TDD uplink-to-downlink interference to other UEs. Thus, if any slots or symbols systematically exhibit high interference levels, the UE 215 may determine that at least two different TDD slot patterns are being utilized within the region of operation associated with the UE.

Upon detecting or inferring different TDD slot patterns within a region of operation as per the methods described above, the UE 215 may further determine the TDD boundary region 230 by mapping the TDD slot patterns it has so far detected (e.g., as indicated by various tdd-UL-DL-ConfigurationCommon IEs and/or inferred from various interference or signal strength measurements) to geolocation information associated with the UE 215. To minimize the size of such a geo-database of TDD patterns at the UE 215, the UE 215 may retain the information about various TDD slot patterns only for locations in which two or more TDD slot patterns are detected, and only for a certain period of time. More particularly, the UE 215 may be configured to determine a geolocation of the UE 215 (such as by using global navigation satellite system (GNSS) signals received by the UE, NR positioning features associated with the UE (e.g., angle of arrival/departure), accelerometer, barometer and other sensor-based positioning, and/or the like). The network device 205, 210 may also assist with determining the geolocation of the UE 215 (e.g., if some of the above positioning features are not implemented or cannot be used by the UE 215), such as by using identifiers of the serving cell (e.g., a cell global identity (CGI), a physical layer cell identity (PCI), an E-UTRAN cell global identifier (ECGI), or similar identifier) and network topology information. The UE 215 may be configured to map the first TDD slot pattern (e.g., TDD pattern 1) and the second TDD slot pattern (e.g., TDD pattern 2) to the current geolocation of the UE 215, and store that information (e.g., in an internal memory of the UE 215, or in a server the UE 215 is communicating with via an application). In such implementations, the UE 215 may accumulate and refine over time intelligence about TDD patterns in a given area, instead of, or complementary to, instantly detecting the different TDD slot patterns at a given location, which may not always be practical (e.g., due to UE 215 idling hence currently not being able to decode the TDD configuration messages from a particular gNB, or due to radio frequency (RF) channel fluctuations preventing the UE from sensing the interference from a particular gNB).

In some implementations, the UE 215 may utilize artificial intelligence/machine learning (AI/ML) instead of, or complementary to, deterministic algorithms, to enhance the TDD pattern detection and TDD boundary region determination abilities of the UE 215. For instance, the UE 215 may apply a machine learning model to more accurately infer TDD slot patterns at a given location based on measuring interference levels or signal strengths as per the second method described above (in such situations when the UE cannot directly decode the TDD configuration signaling as per the first method), and possibly associate confidence levels to these inferences. The UE 215 may further apply the same or another machine learning model to more accurately determine the limits of the TDD boundary region 230 based on the intelligence previously accumulated by the UE 215 on the TDD slot patterns associated with geolocation, time-stamps, and/or confidence levels.

As shown in FIG. 2B, in some implementations, the UE 215 may self-determine a boundary region TDD slot pattern (e.g., an alternative TDD slot pattern) to be used for communications in this region based on at least one of the first TDD slot pattern (e.g., TDD pattern 1) or the second TDD slot pattern (e.g., TDD pattern 2), and the UE 215 may thus communicate with a network device (e.g., one of the first network device 205 or the second network device 210) using the boundary region TDD slot pattern. More particularly, in this example, the first TDD slot pattern, as indicated by reference number 220, may include semi-statically scheduled downlink slots (e.g., "D" slots), a special slot and/or a switch slot (e.g., an "S" slot), and uplink slots (e.g., "U" slots) according to the repeating pattern DDDSUUDDDD. In contrast, the second TDD slot pattern, as indicated by reference number 225, may include semi-statically scheduled downlink slots, a special and/or a switch slot, and uplink slots associated with the repeating pattern DDD-SUUUUDD. In that regard, the seventh and eighth slots differ between the two TDD slot patterns, because the seventh and eighth slots of the first TDD slot pattern are downlink slots and the seventh and eighth slots of the second TDD slot pattern are uplink slots. In such examples, the UE 215 may determine that, when communicating with the second network device 210, the UE 215 should not transmit any uplink communications using the seventh and eighth slots, as indicated by reference number 235, because doing so may cause uplink-to-downlink interference for neighboring UEs receiving downlink communications from the first network device 205 in the seventh and eighth slots. Put another way, in such implementations, the UE 215 may determine a boundary region TDD slot pattern to be used for communications within the second cell that is similar to the second TDD slot pattern, but in which no uplink communications are transmitted in the seventh and eight slots (e.g., the seventh and eighth slots may be treated similar to guard-period slots).

Moreover, although both the fourth slot associated with the first TDD slot pattern and the fourth slot associated with the second TDD slot pattern are special and/or switch slots, the symbols within the slots may differ between the TDD slot patterns. More particularly, the fourth slot of the first TDD slot pattern may include semi-statically scheduled downlink symbols (e.g., "D" symbols), guard-period symbols (e.g., "G" symbols), and uplink symbols (e.g., "U" symbols) in the order DDDDDDGGGGUUUU. In contrast, the fourth slot of the second TDD slot pattern may include semi-statically scheduled downlink symbols, guard-period symbols, and uplink symbols in the order DDDDDDG-GUUUUUU. In that regard, the ninth and tenth symbols differ between the two TDD slot patterns, because the ninth and tenth symbols of the S slot of the first TDD slot pattern are guard symbols and the ninth and tenth slots of the second TDD slot pattern are uplink symbols. In such examples, the UE 215 may determine that, when communicating with the second network device 210, the UE 215 should not transmit any uplink communications using the ninth and tenth symbols in the S slot, as shown by reference number 240, because doing so may cause uplink-to-downlink interference for neighboring UEs receiving downlink communications from the first network device 205 in the S slot. Put another way, in such implementations, the UE 215 may determine a boundary region TDD slot pattern to be used for communications within the second cell that is similar to the second TDD slot pattern, but in which no uplink communinications are transmitted in the ninth and tenth symbols of the S slot (e.g., the ninth and tenth symbols are treated similar to guard-period symbols). Put more generally, in implementations in which at least one uplink symbol of one of the first TDD slot pattern or the second TDD slot pattern overlaps with at least one downlink or guard symbol of the other one of the first TDD slot pattern or the second TDD slot pattern, the UE 215 may communicate with a network device 205, 210 by refraining from transmitting a communication in the at least one uplink symbol.

In some implementations, the UE 215 and the network device 205, 210 may cooperate to detect the TDD slot patterns and/or to determine the TDD boundary region 230. In such implementations, the UE 215 may report the information about the conflicting TDD slot patterns it has detected or inferred to a network device 205, 210 it is connected to (e.g., to a serving gNB of the UE 215), such as for purposes of the network device 205, 210 communicating with the UE 215 via a revised TDD slot pattern (e.g., a boundary region TDD slot pattern). For example, when the UE 215 is connected to the network device 205, the UE 215 may transmit to the network device 205 an indication of the second TDD slot pattern (associated with network device 210) detected or inferred by the UE 215, and/or a TDD boundary region determined by the UE 215. In response, the network device 205 may revise the TDD slot pattern to be used for all communications in the service cell of the UE 215 and/or for communications between the UE 215 and the network device 205. This may reduce the risk of the network device 205 causing TDD downlink-to-uplink interference to network device 210, or the risk of the UE 215 being impacted by TDD uplink-to-downlink interference from other UEs. The UE 215 reporting certain TDD slot pattern information to a network device 205, 210 may benefit in particular instances in which the network devices 205, 210 do not have a capability to detect a different TDD pattern from other network devices in the vicinity, and/or instances in which the network devices 205, 210 do not have a capability to detect TDD cross-link interference affecting the UEs they serve.

Additionally, or alternatively, in some implementations, the UE 215 may transmit, to one or more other UEs, an indication of at least one of the first TDD slot pattern, the second TDD slot pattern, or the boundary region TDD slot pattern, such as via an NR sidelink, and/or the UE 215 may receive TDD slot pattern information from other UEs, such as via the NR sidelink. In such implementations, the UE 215 may determine the TDD boundary region 230 based on TDD information received from network devices (e.g., via tdd-UL-DL-ConfigurationCommon IEs), via interference or signal strength measurements performed by the UE 215, and/or via TDD slot pattern information received from other UEs (which may have been determined by the other UEs from tdd-UL-DL-ConfigurationCommon IEs, interference or signal strength measurements, TDD slot pattern information received from other UEs, or similar sources).

As allowed by the current standards, the UE 215 may receive, from a serving network device 205, 210 (e.g., a serving gNB), RRC configuration information indicating that the UE 215 is permitted to skip certain uplink data transmissions (e.g., PUSCH transmissions) that the UE 215 is otherwise scheduled for by the gNB. More particularly, an enhanced skip uplink transmission parameter (sometimes referred to as an enhancedSkipUplinkTxDynamic IE or enhancedSkipUplinkTxConfigured IE) may be transmitted by the gNB to the UE 215, such as via an RRC reconfiguration message, indicating that the UE 215 is permitted to skip uplink transmissions when the UE 215 has no data in its buffer. In some implementations, the enhanced skip uplink transmission parameter (e.g., enhancedSkipUplinkTxDynamic IE or enhancedSkipUplinkTxConfigured IE) may be supplemented, or else a similar new parameter and/or IE may be specified, for the gNB to indicate to the UE 215 that the UE 215 is permitted to skip uplink data transmissions (e.g., PUSCH transmissions) even when the UE 215 has data in its buffer to transmit, such as for purposes of mitigating uplink-to-downlink interference in the TDD boundary region 230. For instance, this mechanism would allow the UE 215 to skip the uplink communications associated with the uplink slots indicated by reference number 235 and/or uplink communications associated with the uplink symbols indicated by reference number 240 in FIG. 2B. Such a UE self-enforced alternative TDD slot pattern is attractive from the point of view of removing most involvement from the gNB (other than pre-configuring one or more IEs). Put another way, coupled with the UE-based detection of TDD slot patterns and TDD boundary region, the mechanism proposed above may allow for a mostly UE-centric implementation, thus bringing more flexibility in terms of deployment options for adjacent networks operating different TDD patterns. This may be especially convenient if there is a lack of communication between the two networks, and/or if some of the network devices do not have a capability to infer TDD slot patterns of neighboring cells.

Additionally, or alternatively, to ensure that the network device 205, 210 (e.g., a serving gNB) and the UE 215 remain synchronized (e.g., to avoid triggering a hybrid automatic repeat request (HARQ) failure or a similar error at the gNB scheduler) if the UE 215 skips an uplink communication in order to mitigate uplink-to-downlink interference or the like, the UE 215 may send to the serving gNB, an indication that the UE 215 will start skipping one or more uplink transmissions based on determining that the UE 215 is now operating in a TDD boundary region 230. For example, in some implementations, a new medium access control (MAC) control element (MAC-CE) may be specified by which the UE 215 may dynamically indicate to the serving gNB when the UE 215 starts and/or stops skipping transmitting in certain uplink slots (e.g., as indicated by reference number 235) and/or symbols (e.g., as indicated by reference number 240), for TDD interference avoidance purposes.

In some implementations, the UE 215 and the network device 205, 210 may cooperate to detect the TDD slot patterns and/or to determine the TDD boundary region, while the network device (e.g., a serving gNB) may still enforce the alternative TDD slot pattern as described above in connection with FIGS. 1A-1G. In such implementations, based on one or more communications received from the UE 215 (e.g., a communication indicating the first TDD slot pattern, the second TDD pattern, and/or the TDD boundary region, a communication indicating that the UE 215 is skipping one or more uplink transmissions, or a similar communication), a serving network device 205, 210 may alter a TDD slot pattern for the UE 215 and/or at the cell level, in a similar manner as described above in connection with FIGS. 1A-1G. In such implementations, the network device 205, 210 may reconfigure the UE 215 with a new semi-static slot pattern for use within the TDD boundary region 230, such as via a tdd-UL-DL-ConfigurationCommon IE when the TDD slot pattern is altered at the cell level, via a tdd-UL-DL-ConfigurationDedicated IE when the TDD slot pattern is specific to this UE or to a group of UEs, and/or via dynamic scheduling (e.g., via downlink control information (DCI) in a physical downlink control channel (PDCCH), a MAC-CE, or a similar message). One benefit from optionally using the tdd-UL-DL-ConfigurationDedicated IE and/or dynamic scheduling when a network device 205, 210 enforces an alternative TDD slot pattern is to allow for a finer definition of the TDD boundary region 230, than the cell level granularity otherwise allowed with the tdd-UL-DL-ConfigurationCommon IE.

By determining that the UE 215 is operating in a TDD boundary region 230 and/or by communicating with a network device 205, 210 using a boundary region TDD slot pattern (e.g., by refraining from transmitting uplink communications in certain uplink slots or symbols), the UE 215 may mitigate colliding communications and/or interference at the UE 215, the network devices 205, 210, and/or neighboring UEs. This may be more readily understood with reference to the particular example scenario shown in FIG. 2C. More particularly, as shown in FIG. 2C, a first network device 245 (e.g., one of network device 205 or network device 210) may be a macro network device associated with a downlink-centric TDD ratio (e.g., a DL-biased TDD ratio) and a second network device 250 (e.g., the other one of network device 205 or network device 210) may be a small cell, indoor network device (e.g., an onsite device within a building or similar premises 255) associated with an uplink-centric TDD ratio. In such implementations, the first network device 245 may be transmitting at a relatively high power, and thus may penetrate the premises 255 associated with the second network device 250 (e.g., associated with the onsite private network) and thus cause some TDD downlink-to-uplink interference 260 at the second network device 250. On the other hand, the second network device 250 may transmit at a relatively low power, and thus its signal may be substantially contained within the premises 255 associated with the second network device 250, and thus may cause little or no interference to the first network device 245. However, the second network device 250 may not be aware that the second network device 250 is being impacted by TDD downlink-to-uplink interference 260 due to, e.g., lack of communication between the two networks and/or because the second network device 250 may not have a capability to infer TDD slot patterns of neighboring cells. Moreover, a first UE 265 (shown as UE1 in FIG. 2C) may be communicating with the first network device 245 (e.g., the first network device 245 may be the serving network device of the first UE 265), and a second UE 270 (shown as UE2 in FIG. 2C) may be communicating with the second network device 250 (e.g., the second network device 250 may be the serving network device of the second UE 270). Accordingly, the first UE 265 may be impacted by TDD uplink-to-downlink interference 275 caused by the second UE 270 transmitting uplink communications in uplink slots or symbols associated with the second TDD slot pattern that overlap with downlink slots or symbols associated with the first TDD slot pattern.

In such implementations, the second UE 270 may assist the network in detecting TDD downlink-to-uplink interference 260 occurring at the second network device 250, such as by determining that the second UE 270 is in the TDD boundary region 230 using the methods described above, and may indicate the same to the second network device 250. In response, the second network device 250 may alter its TDD slot pattern in order to mitigate interference, such as by not using and/or scheduling contention slots or symbols (e.g., such as by using fewer uplink slots or symbols), as described in detail above in connection with FIGS. 1A-1G. Similarly, the first UE 265 may assist the network in detecting the TDD downlink-to-uplink interference 260 occurring at the second network device 250, such as by determining that the first UE 265 is in the TDD boundary region 230 using the methods described above, and may indicate the same to the first network device 245. In response, the first network device 245 may alter its TDD slot pattern in order to mitigate interference, such as by not using and/or scheduling contention slots or symbols (e.g., such as by using fewer downlink slots or symbols), as described in detail above in connection with FIGS. 1A-1G.

Moreover, the second UE 270 may detect the potential for the second UE 270 to be causing TDD uplink-to-downlink interference 275 to other UEs in the vicinity (e.g., the first UE 265 communicating with the network device 245), such as by determining that the second UE 270 is in the TDD boundary region 230 using the methods described above. In response, the second UE 270 may alter its TDD slot pattern in order to mitigate interference, such as by not using certain slots or symbols, as described in detail above in connection with FIGS. 2A-2B. Additionally, or alternatively, the second UE 270 may signal to the second network device 250 the risk of TDD uplink-to-downlink interference 275 that the second UE 270 may be causing to other UEs (e.g., the first UE 265), and thus the second network device 250 may alter its TDD slot pattern in order to mitigate interference, such as by not using and/or scheduling contention slots or symbols (e.g., such as by using fewer uplink slots or symbols), as described in detail above in connection with FIGS. 1A-1G. Similarly, the first UE 265 may detect the TDD uplink-to-downlink interference 275 occurring at the first UE 265, such as by determining that the first UE 265 is in the TDD boundary region 230 using the methods described above. In response, the first UE 265 may signal to the first network device 245 the risk of TDD uplink-to-downlink interference 275 at the first UE 265, and thus the first network device 245 may alter its TDD slot pattern in order to mitigate interference, such as by not using and/or scheduling contention slots or symbols (e.g., such as by using fewer downlink slots or symbols), as described in detail above in connection with FIGS. 1A-1G. The detection and mitigation methods described above in connection with the example scenario shown in FIG. 2C are summarized in table 280 shown in FIG. 2D.

As a result, aspects of the disclosure enable the use of optimized TDD slot patterns in various coverage areas or cells, such as uplink-centric TDD slot patterns in onsite cells and downlink-centric TDD in macrocells, while avoiding uplink/downlink collisions within a TDD boundary region between the cells. This may result in decreased latency, increased throughput, decreased communication error rates, and overall more efficient usage of network resources, as described.

As indicated above, FIGS. 2A-2D are provided as an example. Other examples may differ from what is described with regard to FIGS. 2A-2D. The number and arrangement of devices shown in FIGS. 2A-2D are provided as an example. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) shown in FIGS. 2A-2D may perform one or more functions described as being performed by another set of devices shown in FIGS. 2A-2D.

Figure 3:
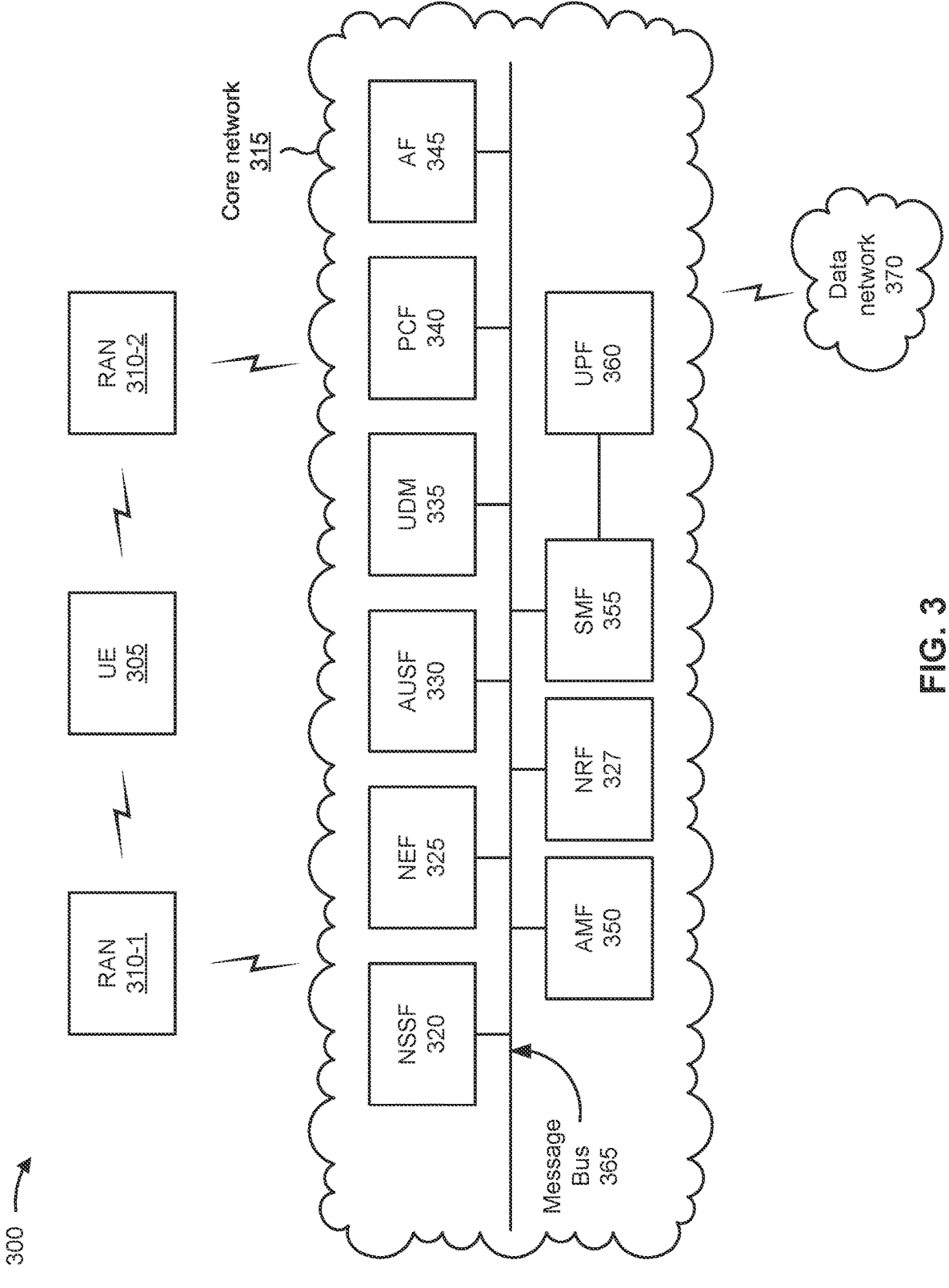
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 305 (e.g., UE 115), a first and second radio access network (RAN) 310-1, 310-2 (with each RAN 310-1, 310-2 being associated with one of an onsite network device 105, a macro network device 110, or a similar RAN entity), a core network 315, and a data network 370. Devices and/or networks of example environment 300 may interconnect via wired connections, wireless connections, or a combination of wired and wireless connections. Although for ease of description only a single core network 315 is shown in FIG. 3, embodiments of the disclosure are not so limited. In some other implementations, a RAN (e.g., RAN 310-1 and/or 310-2) may be in communication with multiple core networks. For example, an onsite or private network may be associated with two core networks (e.g., a private core network and a public core network).

UE 305 includes one or more devices capable of receiving, generating, storing, processing, and/or providing information, such as information described herein. For example, UE 305 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RANs 310-1, 310-2 may support, for example, a cellular radio access technology (RAT). RANs 310-1, 310-2 may include one or more base stations (e.g., base transceiver stations, radio base stations, node Bs, eNBs, gNBs, base station subsystems, cellular sites, cellular towers, access points, transmit receive points (TRPs), radio access nodes, macrocell base stations, microcell base stations, picocell base stations, femtocell base stations, repeaters, or similar types of devices) and other network entities that can support wireless communication for UE 305. RANs 310-1, 310-2 may transfer traffic between UE 305 (e.g., using a cellular RAT), one or more base stations (e.g., using a wireless interface or a backhaul interface, such as a wired backhaul interface), and/or core network 315. RANs 310-1, 310-2 may provide one or more cells that cover geographic areas. In some implementations, one of the first RAN 310-1 or the second RAN 310-2 may be associated with the onsite network device 105 and/or the onsite cell 120, while the other one of the first RAN 310-1 or the second RAN 310-2 is associated with the macro network device 110 and/or the macrocell 125.

In some implementations, RANs 310-1, 310-2 may perform scheduling and/or resource management for UE 305 covered by a RAN 310-1, 310-2 (e.g., UE 305 covered by a cell provided by a RAN 310-1, 310-2). In some implementations, RANs 310-1, 310-2 may be controlled or coordinated by a network controller, which may perform load balancing, network-level configuration, and/or other operations. The network controller may communicate with RANs 310-1, 310-2 via a wireless or wireline backhaul. In some implementations, RANs 310-1, 310-2 may include a network controller, a self-organizing network (SON) module or component, or a similar module or component. In other words, RANs 310-1, 310-2 may perform network control, scheduling, and/or network management functions (e.g., for uplink, downlink, and/or sidelink communications of UE 305 covered by a RAN 310-1, 310-2).

In some implementations, core network 315 may include an example functional architecture in which systems and/or methods described herein may be implemented. For example, core network 315 may include an example architecture of a fifth generation (5G) next generation (NG) core network included in a 5G wireless telecommunications system. While the example architecture of core network 315 shown in FIG. 3 may be an example of a service-based architecture, in some implementations, core network 315 may be implemented as a reference-point architecture and/or a 4G core network, among other examples.

As shown in FIG. 3, core network 315 may include a number of functional elements, sometimes referred to as network function (NF) devices. The functional elements may include, for example, a network slice selection function (NSSF) 320, a network exposure function (NEF) 325, a network repository function (NRF) 327, an authentication server function (AUSF) 330, a unified data management (UDM) component 335, a policy control function (PCF) 340, an application function (AF) 345, an access and mobility management function (AMF) 350, a session management function (SMF) 355, and/or a user plane function (UPF) 360, among other examples. These functional elements may be communicatively connected via a message bus 365 or service-based architecture transport network. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 320 includes one or more devices that select network slice instances for UE 305. By providing network slicing, NSSF 320 allows an operator to deploy multiple substantially independent end-to-end networks potentially with the same infrastructure. In some implementations, each slice may be customized for different services.

NEF 325 includes one or more devices that support exposure of capabilities and/or events in the wireless telecommunications system to help other entities in the wireless telecommunications system discover network services. For example, in some implementations, NEF 325 may expose a TDD slot structure currently in use by a device.

NRF 327 includes one or more devices that may provide a discovery function for NF devices. An NF device may send registration information to NRF 327, and NRF 327, in response to receiving a query concerning a locality from a different NF device, may send NF device information to the different NF device.

AUSF 330 includes one or more devices that act as an authentication server and support the process of authenticating UE 305 in the wireless telecommunications system.

UDM 335 includes one or more devices that store user data and profiles in the wireless telecommunications system. UDM 335 may be used for fixed access and/or mobile access in core network 315.

PCF 340 includes one or more devices that provide a policy framework that incorporates network slicing, roaming, packet processing, and/or mobility management, among other examples.

AF 345 includes one or more devices that support application influence on traffic routing, access to NEF 325, and/or policy control, among other examples.

AMF 350 includes one or more devices that act as a termination point for non-access stratum (NAS) signaling and/or mobility management, among other examples.

SMF 355 includes one or more devices that support the establishment, modification, and release of communication sessions in the wireless telecommunications system. For example, SMF 355 may configure traffic steering policies at UPF 360 and/or may enforce user equipment internet protocol (TP) address allocation and policies, among other examples.

UPF 360 includes one or more devices that serve as an anchor point for intraRAT and/or interRAT mobility. UPF 360 may apply rules to packets, such as rules pertaining to packet routing, traffic reporting, and/or handling user plane QoS, among other examples.

Message bus 365 represents a communication structure for communication among the functional elements. In other words, message bus 365 may permit communication between two or more functional elements. In some implementations, message bus 365 may be viewed as and/or associated with a transport interface between network functions.

Data network 370 includes one or more wired and/or wireless data networks. For example, data network 370 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
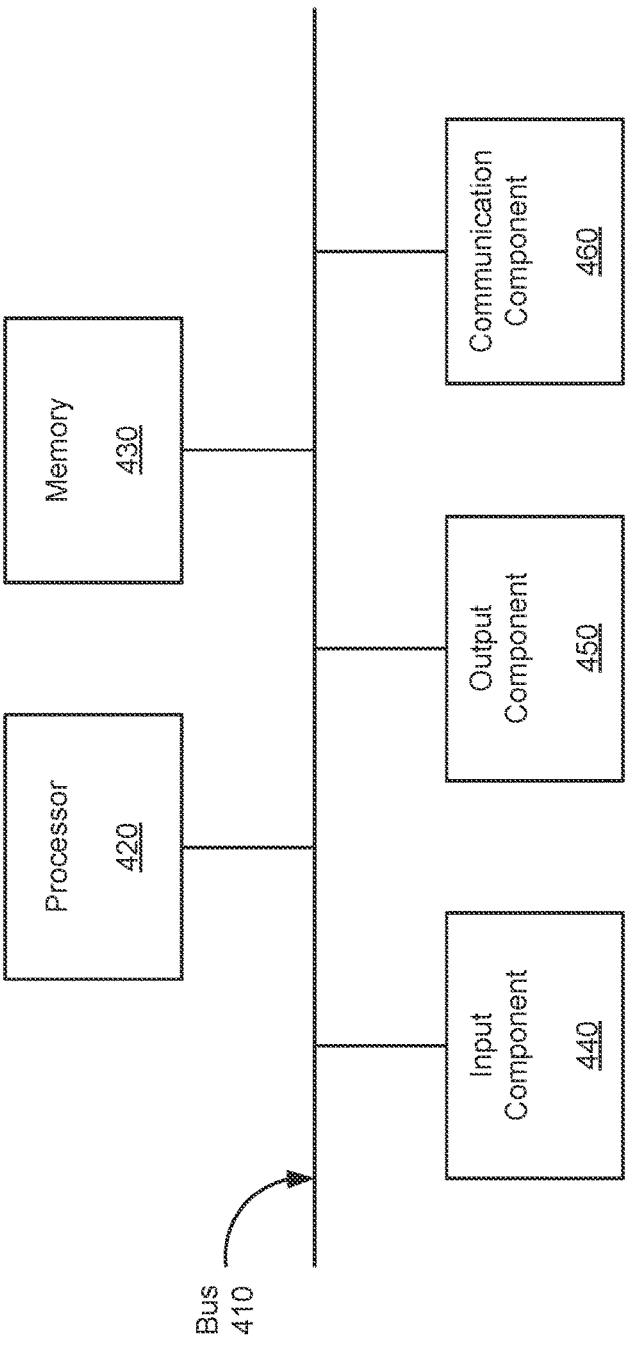
FIG. 4 is a diagram of example components of a device associated with a TDD slot pattern determination.

FIG. 4 is a diagram of example components of a device 400 associated with a TDD slot pattern determination. Device 400 may correspond to the UE 305, the RAN 310, the NSSF 320, the NEF 325, the NRF 327, the AUSF 330, the UDM 335, the PCF 340, the AF 345, the AMF 350, SMF 355, and/or the UPF 360. In some implementations, the UE 305, the RAN 310, the NSSF 320, the NEF 325, the NRF 327, the AUSF 330, the UDM 335, the PCF 340, the AF 345, the AMF 350, the SMF 355, and/or the UPF 360 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with TDD slot pattern determination. In some implementations, one or more process blocks of FIG. 5 may be performed by a UE (e.g., UE 215, UE 305). In some implementations, one or more process blocks of FIG. 5 may be performed by another device or a group of devices separate from or including the UE, such as a network device (e.g., network devices 205, 210), a RAN (e.g., RAN 310), an NSSF (e.g., NSSF 320), an NEF (e.g., NEF 325), an NRF (e.g., NRF 327), an AUSF (e.g., AUSF 330), a UDM (e.g., UDM 335), a PCF (e.g., PCF 340), an AF (e.g., AF 345), an AMF (e.g., AMF 350), an SMF (e.g., SMF 355), and/or a UPF (e.g., UPF 360). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include determining that the UE is operating in a TDD boundary region in which the UE receives or measures signals from two or more cells or other UEs (block 510). For example, the UE may determine that the UE is operating in a TDD boundary region in which the UE receives or measures signals from two or more cells or other UEs, as described above.

As further shown in FIG. 5, process 500 may include determining that a first TDD slot pattern associated with at least one of a first cell or a first other UE differs from a second TDD slot pattern associated with at least one of a second cell or a second other UE (block 520). For example, the UE may determine that a first TDD slot pattern associated with at least one of a first cell or a first other UE differs from a second TDD slot pattern associated with at least one of a second cell or a second other UE, as described above. In some implementations, process 500 includes determining, by the UE, at least one of the first TDD slot pattern based on a first TDD configuration message received from a first network device associated with the first cell, the first TDD slot pattern based on interference or signal strength measurements performed by the UE, the second TDD slot pattern based on a second TDD configuration message received from a second network device associated with the second cell, or the second TDD slot pattern based on interference or signal strength measurements performed by the UE. Additionally, or alternatively, process 500 may include determining, by the UE, a geolocation of the UE, and mapping, by the UE, the first TDD slot pattern and the second TDD slot pattern to the geolocation of the UE. In some implementations, at least one of determining that the UE is operating in the TDD boundary region, or determining that the first TDD slot pattern associated with the at least one of the first cell or the first other UE differs from the second TDD slot pattern associated with the at least one of the second cell or the second other UE, is performed by the UE using deterministic algorithms or a machine learning model.

As further shown in FIG. 5, process 500 may include determining a boundary region TDD slot pattern to be used for communications within the TDD boundary region based on at least one of the first TDD slot pattern or the second TDD slot pattern (block 530). For example, the UE may determine a boundary region TDD slot pattern to be used for communications within the TDD boundary region based on at least one of the first TDD slot pattern or the second TDD slot pattern, as described above.

As further shown in FIG. 5, process 500 may include communicating with a network device using the boundary region TDD slot pattern (block 540). For example, the UE may communicate with a network device using the boundary region TDD slot pattern, as described above. In some implementations, at least one uplink symbol of one of the first TDD slot pattern or the second TDD slot pattern overlaps with at least one downlink or guard symbol of the other one of the first TDD slot pattern or the second TDD slot pattern, and communicating, by the UE, with the network device using the boundary region TDD slot pattern includes refraining from transmitting a communication in the at least one uplink symbol. In some implementations, process 500 includes receiving, by the UE from the network device, an RRC configuration information element indicating that the UE is permitted to skip certain uplink transmissions, even in cases when the UE has data in its buffer, and communicating with the network device using the boundary region TDD slot pattern is based on the RRC configuration information element, and/or transmitting, by the UE to the network device, a MAC-CE dynamic indication that the UE will be skipping certain uplink transmissions for TDD interference avoidance purposes, based on determining that the UE is operating in the TDD boundary region. Additionally, or alternatively, process 500 may include transmitting, by the UE to the network device, an indication of at least one of the first TDD slot pattern, the second TDD slot pattern, or the TDD boundary region, and/or receiving, by the UE from the network device, configuration information indicating the boundary region TDD slot pattern. Moreover, in some implementations, process 500 includes transmitting, by the UE to another UE via an NR sidelink, an indication of at least one of the first TDD slot pattern, the second TDD slot pattern, or the boundary region TDD slot pattern.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is another flowchart showing an example process 600 associated with TDD slot pattern detection, in which TDD slot pattern determination and enforcement may be managed by the UE itself.

As shown in FIG. 6, process 600 may include detecting TDD slot patterns operated by different cells in a given area and/or associating the TDD slot patterns with geolocations, timestamps, and/or confidence levels (block 610). For example, a UE (e.g., UE 115, UE 215, UE 265, UE 270) may detect TDD slot patterns operated by different cells in a given area and/or may associate the TDD slot patterns with geolocations, timestamps, and/or confidence levels.

As further shown in FIG. 6, process 600 may include storing the above information on TDD slot patterns (e.g., TDD slot patterns operated by different cells in a given area associated with geolocations, timestamps, and/or confidence levels) (block 620). For example, the UE may store the above information on TDD slot patterns in an internal memory associated with the UE (e.g., memory 430) or in a server the UE 215 is communicating with via an application.

As further shown in FIG. 6, process 600 may include processing the above information (e.g., TDD slot patterns operated by different cells in a given area associated with geolocations, timestamps, and/or confidence levels), such as via deterministic algorithms or via machine learning, to determine a TDD boundary region (block 630). For example, the UE may process the above information (e.g., via machine learning) to determine the TDD boundary region 230.

As further shown in FIG. 6, process 600 may include processing the above information (e.g., TDD slot patterns operated by different cells in a given area associated with geolocations, timestamps, and/or confidence levels), such as via deterministic algorithms or via machine learning, to determine a boundary region TDD slot pattern with fewer uplink transmissions (block 640). For example, the UE may process the above information (e.g., via machine learning) to determine a boundary region TDD slot pattern with fewer uplink transmissions.

As further shown in FIG. 6, process 600 may include self-enforcing the boundary region TDD slot pattern when communicating with a network device (block 650). For example, when the UE is within the TDD boundary region 230, the UE may self-enforce the boundary region TDD slot pattern when communicating with a network device (e.g., network device 205, network device 210, network device 245, network device 250).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
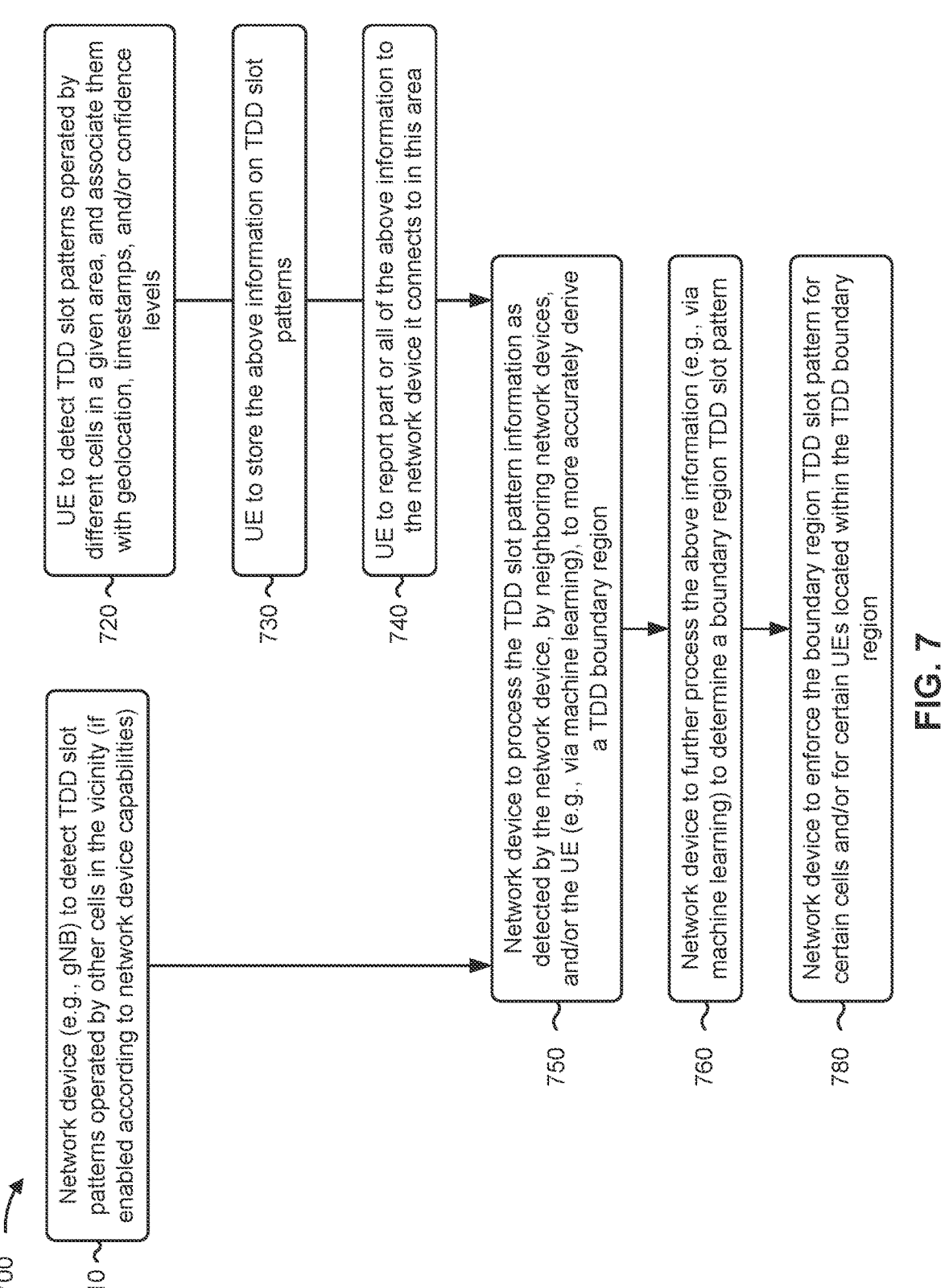
FIG. 7 is another flowchart of an example process associated with a TDD slot pattern determination.

FIG. 7 is another flowchart showing an example process 700 associated with a network device (e.g., a gNB) and a UE collaborating for TDD slot pattern detection and alternative TDD slot pattern determination, with the alternative TDD slot pattern enforcement being managed by the gNB.

As shown in FIG. 7, process 700 may include detecting TDD slot patterns operated by other cells in a vicinity (block 710). For example, a network device (e.g., network device 205, network device 210, network device 245, network device 250), such as a gNB, may detect TDD slot patterns operated by other cells in the vicinity of the network device. In some implementations, the step performed at block 710 may be contingent on whether such detection is enabled for a particular gNB or similar network device and/or whether the gNB or similar network device is capable of detecting TDD slot patterns operated by other cells.

As further shown in FIG. 7, process 700 may include detecting TDD slot patterns operated by different cells in a given area, and associate the TDD slot patterns with geolocation, timestamps, and/or confidence levels (block 720). For example, a UE (e.g., UE 215, UE 265, UE 270) may detect TDD slot patterns operated by different cells in a given area, and associate them with geolocation, timestamps, and/or confidence levels.

As further shown in FIG. 7, process 700 may include storing the above information on TDD slot patterns (e.g., TDD slot patterns operated by different cells in a given area associated with geolocations, timestamps, and/or confidence levels) (block 730). For example, the UE may store the above information on TDD slot patterns in an internal memory associated with the UE (e.g., memory 430) or in a server the UE 215 is communicating with via an application.

As further shown in FIG. 7, process 700 may include reporting part or all of the above information (e.g., TDD slot patterns operated by different cells in a given area associated with geolocations, timestamps, and/or confidence levels) to a network device (block 740). For example, the UE may report part or all of the above information to a network device to which the UE connects to in a particular area.

As further shown in FIG. 7, process 700 may include processing the TDD slot pattern information as detected by the network device, by neighboring network devices, and/or by the UE, such as via deterministic algorithms or via machine learning, to more accurately derive a TDD boundary region (block 750). For example, the network device may process the TDD slot pattern information as detected by the network device, by neighboring network devices, and/or by the UE (e.g., via machine learning) to more accurately derive a TDD boundary region (e.g., TDD boundary region 230).

As further shown in FIG. 7, process 700 may include processing the above information (e.g., TDD slot pattern information as detected by the network device, by neighboring network devices, and/or by the UE), such as via deterministic algorithms or via machine learning, to determine a boundary region TDD slot pattern (block 760). For example, the network device may process the above information (e.g., via machine learning) to determine the boundary region TDD slot pattern.

As further shown in FIG. 7, process 700 may include enforcing the boundary region TDD slot pattern for certain cells and/or for certain UEs located with the TDD boundary region (block 780). For example, the network device may enforce the boundary region TDD slot pattern for certain cells and/or for certain UEs located within the TDD boundary region 230.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by a user equipment (UE), that the UE is operating in a time division duplex (TDD) boundary region in which the UE receives or measures signals from two or more cells or other UEs;

determining, by the UE, that a first TDD slot pattern associated with at least one of a first cell or a first other UE differs from a second TDD slot pattern associated with at least one of a second cell or a second other UE;

determining, by the UE, a boundary region TDD slot pattern to be used for communications within the TDD boundary region based on at least one of the first TDD slot pattern or the second TDD slot pattern;

storing, by the UE, information associating the first TDD slot pattern and the second TDD slot pattern with a geolocation of the UE, a timestamp, and a confidence level, wherein the first TDD slot pattern and the second TDD slot pattern are inferred, based at least in part on one or more interference levels, and wherein the confidence level is associated with the inference; and communicating, by the UE, with a network device using the boundary region TDD slot pattern.

2. The method of claim 1, wherein at least one uplink symbol of one of the first TDD slot pattern or the second TDD slot pattern overlaps with at least one downlink or guard symbol of the other one of the first TDD slot pattern or the second TDD slot pattern, and wherein communicating, by the UE, with the network device using the boundary region TDD slot pattern includes refraining from transmitting a communication in the at least one uplink symbol.

3. The method of claim 1, wherein:

the first TDD slot pattern is based on a first TDD configuration message received from a first network device associated with the first cell, the one or more interference levels are measured by the UE, and the second TDD slot pattern is based on a second TDD configuration message received from a second network device associated with the second cell.

4. The method of claim 1, further comprising:

determining, by the UE, the geolocation of the UE; and mapping, by the UE, the first TDD slot pattern and the second TDD slot pattern to the geolocation of the UE.

5. The method of claim 1, wherein at least one of determining that the UE is operating in the TDD boundary region, or determining that the first TDD slot pattern associated with the at least one of the first cell or the first other UE differs from the second TDD slot pattern associated with the at least one of the second cell or the second other UE, is performed by the UE using deterministic algorithms or a machine learning model.

6. The method of claim 1, further comprising transmitting, by the UE to the network device, an indication of at least one of the first TDD slot pattern, the second TDD slot pattern, or the TDD boundary region.

7. The method of claim 6, further comprising receiving, by the UE from the network device, configuration information indicating the boundary region TDD slot pattern.

8. The method of claim 1, further comprising transmitting, by the UE to another UE via a New Radio (NR) sidelink, an indication of at least one of the first TDD slot pattern, the second TDD slot pattern, or the boundary region TDD slot pattern.

9. The method of claim 1, further comprising receiving, by the UE from the network device, a radio resource control (RRC) configuration information element indicating that the UE is permitted to skip certain uplink transmissions, even in cases when the UE has data in its buffer, wherein communicating with the network device using the boundary region TDD slot pattern is based on the RRC configuration information element.

10. The method of claim 1, further comprising transmitting, by the UE to the network device, a medium access control (MAC) control element (MAC-CE) dynamic indication that the UE will be skipping certain uplink transmissions for TDD interference avoidance purposes, based on determining that the UE is operating in the TDD boundary region.

11. A user equipment (UE), comprising:
one or more processors configured to:
    determine that the UE is operating in a time division duplex (TDD) boundary region in which the UE receives or measures signals from two or more cells, or other UEs;
    determine that a first TDD slot pattern associated with at least one of a first cell or a first other UE differs from a second TDD slot pattern associated with at least one of a second cell or a second other UE;
    determine that at least one uplink symbol of one of the first TDD slot pattern or the second TDD slot pattern overlaps with at least one downlink or guard symbol of the other one of the first TDD slot pattern or the second TDD slot pattern;
    store information associating the first TDD slot pattern and the second TDD slot pattern with a geolocation of the UE, a timestamp, and a confidence level, wherein the first TDD slot pattern and the second TDD slot pattern are inferred, based at least in part on one or more interference levels, and wherein the confidence level is associated with the inference; and
    communicate with a network device by refraining from transmitting a communication in the at least one uplink symbol.

12. The UE of claim 11, wherein:
the first TDD slot pattern is based on a first TDD configuration message received from a first network device associated with the first cell,
the one or more interference levels are measured by the UE, and
the second TDD slot pattern is based on a second TDD configuration message received from a second network device associated with the second cell.

13. The UE of claim 11, wherein the one or more processors are further configured to:
    determine the geolocation of the UE; and
    map the first TDD slot pattern and the second TDD slot pattern to the geolocation of the UE.

14. The UE of claim 11, wherein the one or more processors are further configured to receive, from the network device, a radio resource control (RRC) configuration information element indicating that the UE is permitted to skip certain uplink transmissions, even in cases when the UE has data in its buffer, wherein communicating with the network device by refraining from transmitting the communication in the at least one uplink symbol is based on the RRC configuration information element.

15. The UE of claim 11, wherein the one or more processors are further configured to transmit, to the network device, a medium access control (MAC) control element (MAC-CE) dynamic indication that the UE will be skipping certain uplink transmissions for TDD interference avoidance purposes, based on determining that the UE is operating in the TDD boundary region.

16. The UE of claim 11, wherein the one or more processors are further configured to transmit, to the network device, an indication of at least one of the first TDD slot pattern, the second TDD slot pattern, or the TDD boundary region.

17. A non-transitory computer-readable medium storing a set of instructions, the set of instructions comprising:
    one or more instructions that, when executed by one or more processors of a user equipment (UE), cause the UE to:
        determine that the UE is operating in a time division duplex (TDD) boundary region in which the UE receives or measures signals from two or more cells, or other UEs;
        determine that at least one uplink symbol of a first TDD slot pattern associated with at least one of a first cell or a first other UE overlaps with at least one downlink or guard symbol of a second TDD slot pattern associated with at least one of a second cell or a second other UE;
        store information associating the first TDD slot pattern and the second TDD slot pattern with a geolocation of the UE, a timestamp, and a confidence level, wherein the first TDD slot pattern and the second TDD slot pattern are inferred, based at least in part on one or more interference levels, and wherein the confidence level is associated with the inference; and
        communicate with a network device by refraining from transmitting a communication in the at least one uplink symbol.

18. The non-transitory computer-readable medium of claim 17, wherein the one or more instructions further cause the UE to receive, from the network device, a radio resource control (RRC) configuration information element indicating that the UE is permitted to skip certain uplink transmissions, even in cases when the UE has data in its buffer, wherein communicating with the network device by refraining from transmitting the communication in the at least one uplink symbol is based on the RRC configuration information element.

19. The non-transitory computer-readable medium of claim 17, wherein the one or more instructions further cause the UE to transmit, to the network device, a medium access control (MAC) control element (MAC-CE) dynamic indication that the UE will be skipping certain uplink transmissions for TDD interference avoidance purposes based on determining that the UE is operating in the TDD boundary region.

20. The non-transitory computer-readable medium of claim 17, wherein the one or more instructions further cause the UE to transmit, to another UE via a New Radio (NR) sidelink, an indication of at least one of the first TDD slot pattern or the second TDD slot pattern.

* * * * *